United States Patent
Kodama

(10) Patent No.: US 8,175,631 B2
(45) Date of Patent: May 8, 2012

(54) MOBILE STATION AND METHOD

(75) Inventor: Takeshi Kodama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 12/425,901

(22) Filed: Apr. 17, 2009

(65) Prior Publication Data
US 2010/0009712 A1    Jan. 14, 2010

(30) Foreign Application Priority Data

Jul. 8, 2008   (JP) ................................. 2008-178101

(51) Int. Cl.
*H04W 4/00* (2009.01)

(52) U.S. Cl. ..................... 455/550.1; 455/436; 455/437; 455/438; 455/439; 455/440; 455/441; 455/442; 455/447; 455/448; 455/561

(58) Field of Classification Search .................. 455/436, 455/437, 438, 439, 440, 441, 442, 448, 447, 455/561
See application file for complete search history.

(56) References Cited

U.S. PATENT DOCUMENTS

| | | | |
|---|---|---|---|
| 2005/0197125 A1 | 9/2005 | Kang et al. | |
| 2005/0282562 A1 * | 12/2005 | Lee et al. | 455/458 |
| 2006/0089144 A1 * | 4/2006 | Kim et al. | 455/439 |

FOREIGN PATENT DOCUMENTS

JP    2007525128    8/2007

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Std 802.16e-2005 and IEEE Std 802.16/2004/Cor1-2005.

* cited by examiner

*Primary Examiner* — Pierre-Louis Desir
(74) *Attorney, Agent, or Firm* — Murphy & King, P.C.

(57) ABSTRACT

A disclosed mobile station includes a switching unit for, when the mobile station is in a communication area of a first base station (BS), switching a reception operation to receive a signal transmitted from the first BS during a first period and not to receive the signal during a second period; an acquiring unit for acquiring from a second BS information on a transmission timing of a communication parameter if the mobile station is yet to receive neighboring BS information from the first BS; a query unit for querying the first BS as to whether there are data directed to the mobile station; and a receiving unit for receiving the communication parameter from the second BS according to the transmission timing if the acquired information indicates that the transmission timing is to occur during the first period and a result of the query indicates that there are no data.

17 Claims, 18 Drawing Sheets

FIG.8

| MOB_NBR-ADV RECEPTION STATUS | CINR THRESHOLD (db) |
|---|---|
| UNRECEIVED | 20 |

FIG.9

| MOB_PAG-ADV RECEPTION STATUS |
|---|
| UNRECEIVED |

FIG.12

| BAND WIDTH (MHz) | CENTER FREQUENCY (MHz) | SELECTION PRIORITY |
|---|---|---|
| 5 | 2498.5 | 1 |
| 5 | 2503.5 | 2 |
| 5 | 2508.5 | 3 |

FIG.13

| LISTENING INTERVAL START FRAME NUMBER | LISTENING INTERVAL END FRAME NUMBER |
|---|---|
| 27 | 32 |

FIG.14

| DCD/UCD INFORMATION TRANSMISSION FRAME NUMBER |
|---|
| 30 |

MOBILE STATION AND METHOD

CROSS-REFERENCE TO RELATED APPLICATIONS

This application is based upon and claims the benefit of priority of Japanese Patent Application 2008-178101, filed on Jul. 8, 2008, the entire contents of which are hereby incorporated herein by reference.

FIELD

The present invention is directed to a mobile communications system.

BACKGROUND

There are mobile communications systems which include base stations (BS) and mobile stations (MS). The base stations provide wireless communication areas. In such mobile communications systems, the mobile stations have limited battery capacities. Accordingly, a general mobile communications system cancels the registration of a mobile station with the network if the mobile station does not perform communication for a predetermined period of time and suspends or restricts some functions of the mobile station. Here, the cancellation of the registration with the network includes the deletion of information regarding the mobile station from the base station by, for example, removing the connection of the mobile station to the base station and releasing assigned identification information of the mobile station. The registration with the network includes processes opposite to those performed for the cancellation of the registration. The identification information of the mobile station includes, for example, an IP address. According to the above-mentioned processes, the power consumption of the mobile station is reduced. This mode in which the mobile station operates is called an idle mode.

A mobile communications system to which WiMAX (Worldwide Interoperability for Microwave Access) is applied is described next as an example.

A mobile station and a base station which performs communication with the mobile station (i.e. preferred BS, hereinafter referred to as "source base station") preliminarily determine a listening interval (communication interval) and an unavailable interval (non-communication interval). The mobile station in idle mode receives, during the listening interval, a paging advertisement message which is transmitted from the source base station and indicates the presence or absence of data directed to the mobile station. At this point, if reported by the paging advertisement that there are data directed to the mobile station, the mobile station wakes up from idle mode and performs a communication reestablishment process with the source base station in order to receive the data directed to the mobile station. The paging advertisement may be referred to as MOB_PAG-ADV. The source base station constitutes a paging group. The paging group includes multiple base stations. The following describes a case where a mobile station in idle mode moves and initiates communication with a base station belonging to a paging group different from a paging group to which a source base station of the mobile station belongs. In this case, the mobile station performs communication with a base station covering an area to which the mobile station has moved to (i.e. target BS, hereinafter referred to as "destination base station"). In the communication, the mobile station updates its location information (location update).

In order to communicate with a base station, the mobile station uses communication parameter information unique to the base station. The communication parameter information includes, for example, information regarding sub-channels used for data transmission and reception and a modulation scheme used for converting data into a signal. The communication parameter information includes a downlink channel descriptor (DCD) and an uplink channel descriptor (UCD). For example, the DCD includes a MAC message which specifies characteristics of the downlink physical layer, and the UCD includes a MAC message which specifies characteristics of the uplink physical layer.

In WiMAX, a base station distributes its DCD/UCD information, and also distributes DCD/UCD information of a base station adjacent to the base station as neighboring base station information periodically. The period is 30 seconds, for example. The neighboring base station information may be referred to as MOB_NBR-ADV. The mobile station obtains in advance the DCD/UCD information of the neighboring base station from MOB_NBR-ADV. Accordingly, when switching the connection destination to a destination base station (target BS), the mobile station is able to immediately initiate communication.

[Non-patent Document 1] IEEE802.16e

The following explains a case where the mobile station moves to a communication area of a destination base station before the neighboring base station information is distributed. Depending on the distribution timing of the neighboring base station information, the mobile station may switch the connection destination to the destination base station without receiving MOB_NBR-ADV. In this case, if the paging group to which the destination base station belongs is different from the paging group to which the source base station of the mobile station belongs, the mobile station does not have DCD/UCD information of the destination base station. Therefore, the mobile station waits until the DCD/UCD information is distributed by the destination base station. After receiving the DCD/UCD information from the destination base station, the mobile station updates its location information (location update). Therefore, if the mobile station moves to the communication area of the destination base station before the neighboring base station information is distributed, it may take some time for the mobile station to be able to initiate communication.

SUMMARY

One aspect of the present disclosure is a mobile station including a switching unit configured to, when the mobile station is located in a communication area of a first base station, switch a reception operation so as to receive a signal transmitted from the first base station during a first time period and so as not to receive the signal transmitted from the first base station during a second time period; an acquiring unit configured to acquire from a second base station information on a transmission timing of a communication parameter of the second base station in the case where the mobile station is yet to receive neighboring base station information from the first base station, the neighboring base station information including the communication parameter of the second base station; a query unit configured to query the first base station as to whether there are data directed to the mobile station from the first base station; and a receiving unit configured to receive the communication parameter transmitted from the second base station according to the transmission timing of the communication parameter if the information acquired by the acquiring unit indicates that the transmission timing of the communication parameter is to occur during the first time period and a result of the query by the query unit indicates that there are no data directed to the mobile station from the first base station.

Another aspect of the present disclosure is a system including a switching unit configured to, when the mobile station is located in a communication area of a first base station, switch a reception operation so as to receive a signal transmitted from the first base station during a first time period and so as not to receive the signal transmitted from the first base station during a second time period; an acquiring unit configured to acquire from a second base station information on a transmission timing of a communication parameter of the second base station in the case where the mobile station is yet to receive neighboring base station information from the first base station, the neighboring base station information including the communication parameter of the second base station; a query unit configured to query the first base station as to whether there are data directed to the mobile station from the first base station; and a receiving unit configured to receive the communication parameter transmitted from the second base station according to the transmission timing of the communication parameter if the information acquired by the acquiring unit indicates that the transmission timing of the communication parameter is to occur during the first time period and a result of the query by the query unit indicates that there are no data directed to the mobile station from the first base station.

Another aspect of the present disclosure is a method applied to a mobile station. The method includes switching, when the mobile station is located in a communication area of a first base station, a reception operation so as to receive a signal transmitted from the first base station during a first time period and so as not to receive the signal transmitted from the first base station during a second time period; acquiring from a second base station information on a transmission timing of a communication parameter of the second base station in the case where the mobile station is yet to receive neighboring base station information from the first base station, the neighboring base station information including the communication parameter of the second base station; querying the first base station as to whether there are data directed to the mobile station from the first base station; and receiving the communication parameter transmitted from the second base station according to the transmission timing of the communication parameter if the acquired information indicates that the transmission timing of the communication parameter is to occur during the first time period and a result of the query indicates that there are no data directed to the mobile station from the first base station.

BRIEF DESCRIPTION OF DRAWINGS

FIG. 8 is an illustration showing an operation of the mobile station according to the embodiment;

FIG. 9 is an illustration showing an operation of the mobile station according to the embodiment;

FIG. 12 is an illustration showing an operation of the mobile station according to the embodiment;

FIG. 13 is an illustration showing an operation of the mobile station according to the embodiment;

FIG. 14 is an illustration showing an operation of the mobile station according to the embodiment;

DESCRIPTION OF EMBODIMENT

Figure 1:
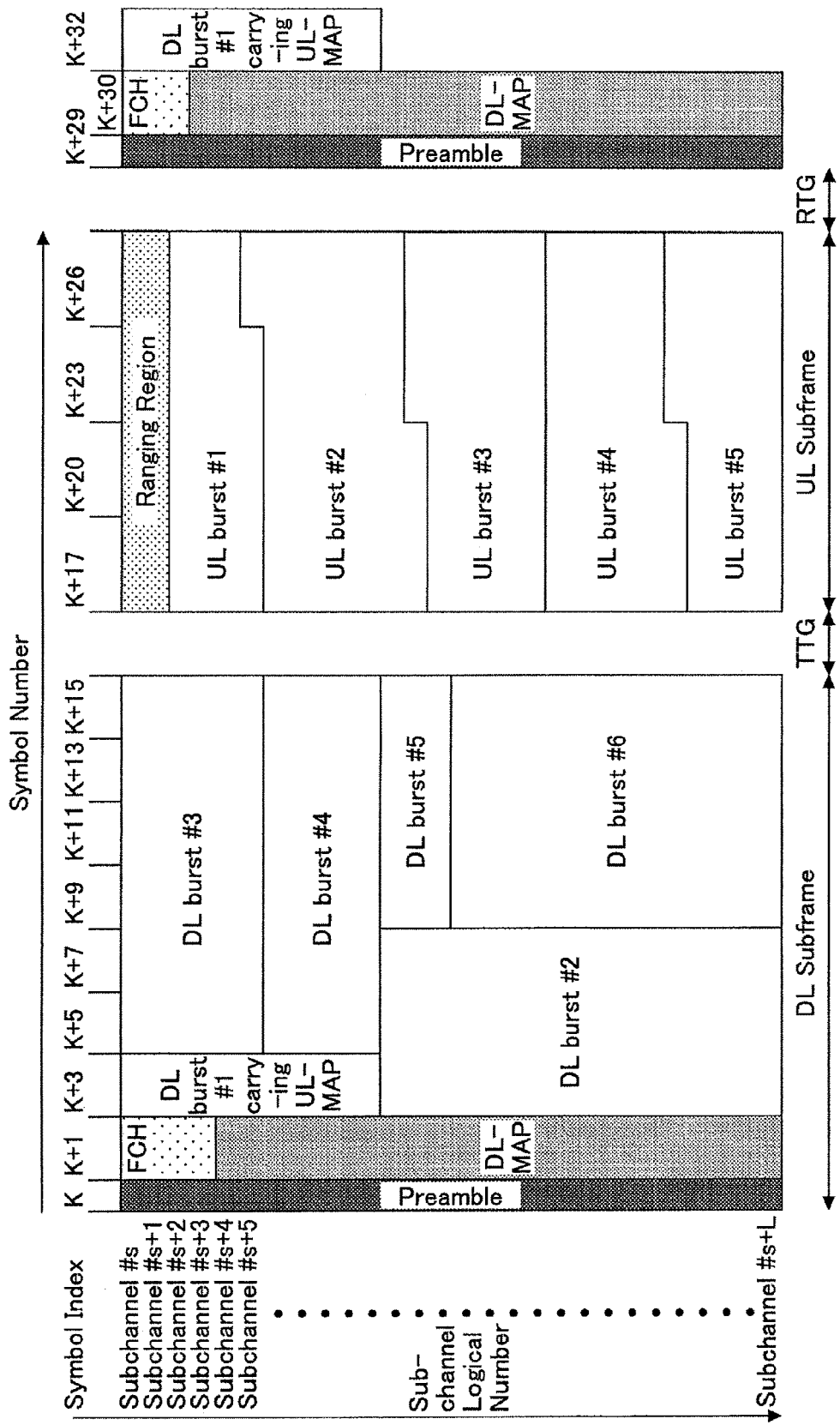
FIG. 1 is an illustration showing an example of a frame format.

Embodiments that describe the best mode for carrying out the present invention are explained next with reference to the drawings.

Note that in all the drawings used to explain the embodiments and their modifications, the same reference numerals are given to components having the same functions, and repeated descriptions are omitted.

Structural Example of Communications System

In a communications system according to the present embodiment, a mobile station is informed of the timing of distributing communication parameters. For example, a base station informs the mobile station of the timing of distributing communication parameters. One example of such a communications system is WiMAX (Worldwide Interoperability for Microwave Access). The present embodiment is described taking WiMax as an example; however, it is applicable to other communications systems in which communication parameters are distributed. In WiMAX, such communication parameters may be referred to as DCD/UCD.

WiMAX employs the TDD (Time Division Duplex) scheme. In the TDD scheme, uplink and downlink signals are transmitted in the same frequency range, and full-duplex communication is achieved by switching the downlink and uplink transmissions at high speed. The transmission frame of the TDD scheme includes a downlink subframe used for transmitting downlink signals and an uplink subframe used for transmitting uplink signals. In addition, the OFDM/OFDMA (Orthogonal Frequency Division Multiplexing/orthogonal Frequency Division Multiple Access) is applied to the communications system of the present embodiment.

The communications system of the present embodiment includes a base station 100 and a mobile station 200. The base station 100 and the mobile station 200 perform wireless communication using the TDD scheme. The transmission frame of the TDD scheme includes a downlink subframe (DL Subframe) and an uplink subframe (UL Subframe), as illustrated in FIG. 1, and one frame includes a pair of a downlink subframe and an uplink subframe. In FIG. 1, the vertical axis represents the subchannel logical number, and the horizontal axis represents the symbol number. In the downlink subframe, one slot includes two symbols, and in the uplink subframe, one slot includes three symbols. The downlink subframe includes a preamble, a frame control header (FCH), a DL-MAP, a UL-MAP and a downlink burst (DL burst). The downlink burst may be divided into multiple sections. FIG. 1 illustrates an example in which the downlink burst is divided into six sections. The uplink subframe includes a ranging region and an uplink burst (UL burst). The uplink burst may be divided into multiple regions. FIG. 1 illustrates an example in which the uplink burst is divided into five sections.

The mobile station 200 transmits an initial ranging code using a ranging region preliminarily allocated in the downlink subframe. The initial ranging code may be referred to as a ranging request (RNG-REQ).

The following measure is conceivable for dealing with the above-described problem that it takes some time for the mobile station to be able to initiate communication in the case where the mobile station moves to the communication area of the destination base station before the neighboring base station information is distributed. For example, if the mobile station without receiving MOB_NBR-ADV determines that it is necessary to switch the connection destination to the destination base station, the mobile station autonomously obtains information of the destination base station prior to the switching process.

For example, if the mobile station without receiving MOB_NBR-ADV determines that it is necessary to switch the connection destination to the destination base station, the mobile station requests a currently communicating base station (source base station) to scan a neighboring base station. Accordingly, the mobile station obtains information of the unavailable interval of the currently communicating base station, and makes connection to the neighboring base station during the unavailable interval to obtain necessary information by referring to a frame transmitted by the neighboring base station.

Figure 2:
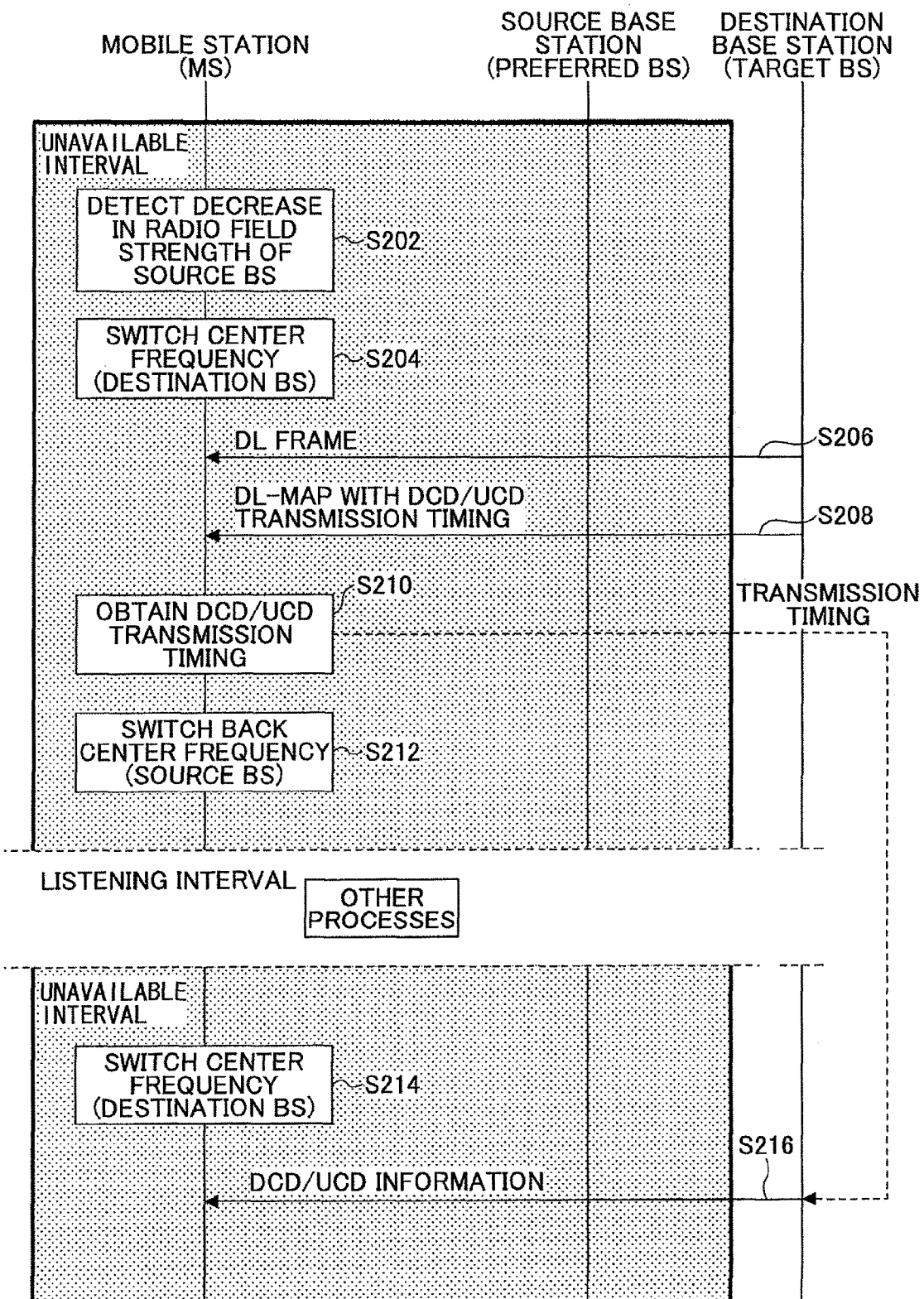
FIG. 2 is a flowchart showing an operation of a mobile station according to one embodiment.

With reference to FIG. 2, the following describes an operation sequence in the case where the above technology is applied to procedures performed by the mobile station in idle mode when switching the connection destination from one base station to another. According to the operation, the mobile station is able to autonomously obtain DCD/UCD information.

The mobile station 200 monitors the radio field strength of the source base station (preferred BS) during the unavailable interval, and detects a decrease in the radio field strength (Step S202).

The mobile station 200 becomes synchronized with a destination base station by adjusting its center frequency to the frequency of the destination base station (Target BS) (Step S204).

The mobile station 200 refers to a frame included in a downlink signal transmitted by the destination base station (Step S206).

The mobile station 200 refers to a DL-MAP included in the downlink subframe (Step S208). The DL-MAP includes frame control information in the downlink direction. For example, the DL-MAP includes information regarding a DCD/UCD transmission timing (DCD/UCD transmission timing information).

The mobile station 200 obtains the DCD/UCD transmission timing information (Step S210).

The mobile station 200 then becomes synchronized with the source base station by adjusting its center frequency to the frequency of the source base station (Step S212). Accordingly, the mobile station 200 switches the connection destination back to the source base station.

Subsequently, the mobile station 200 again becomes synchronized with the destination base station in accordance with a DCD/UCD transmission timing specified by the DCD/UCD transmission timing information (Step S214).

The mobile station 200 refers to a frame included in a downlink signal transmitted by the destination base station, and obtains DCD/UCD information (Step S216). In this case, Step S216 is made during the unavailable interval determined together with the source base station. Accordingly, the mobile station 200 is able to obtain the DCD/UCD information of the destination base station by making connection to the destination base station.

The mobile station 200 becomes synchronized with the source base station by adjusting its center frequency to the frequency of the source base station. In this manner, the mobile station 200 switches the connection destination back to the source base station.

Accordingly, even if switching the connection destination to the destination base station before receiving MOB_NBR-ADV, the mobile station is able to promptly initiate communication using the obtained DCD/UCD information.

Figure 3:
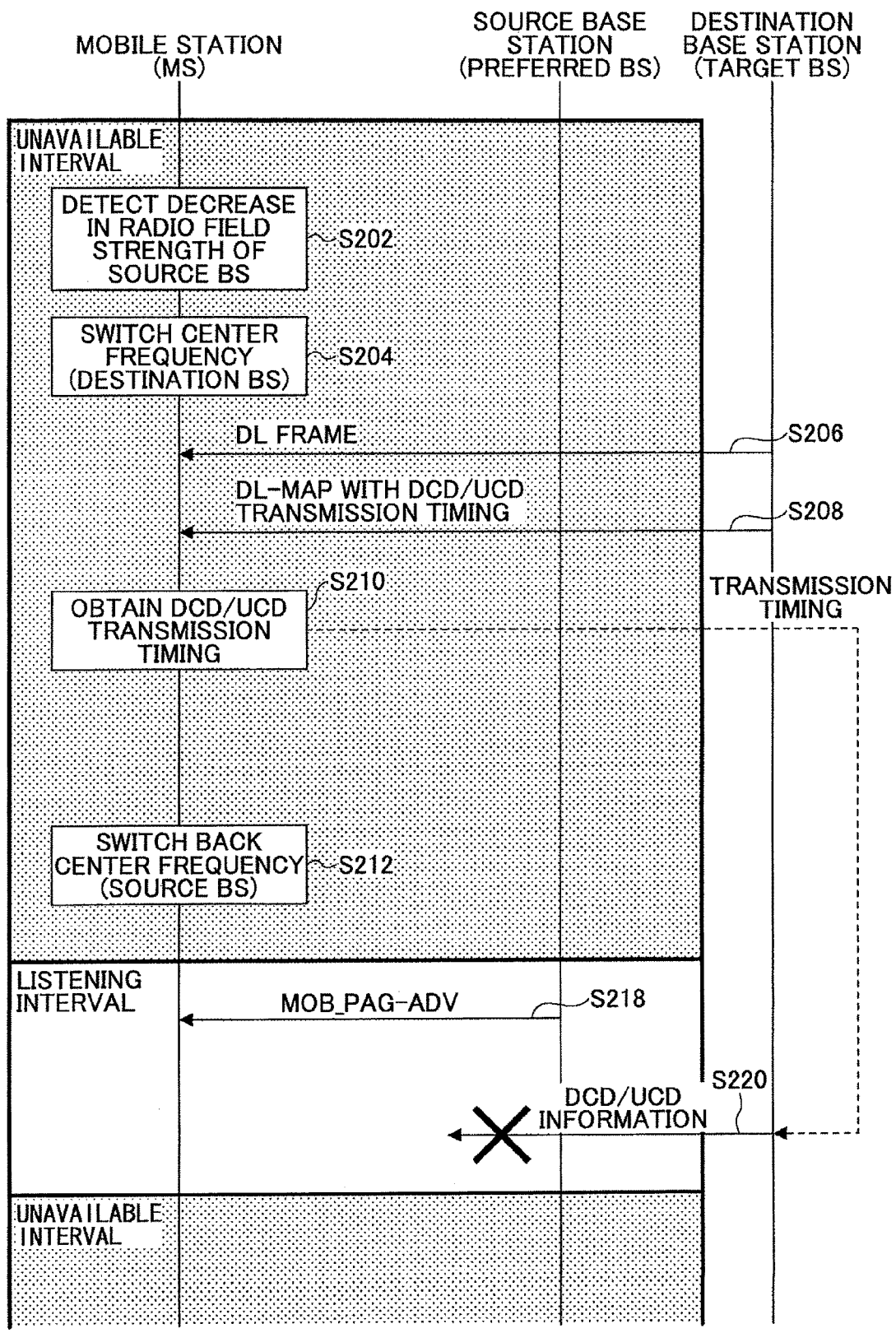
FIG. 3 is a flowchart showing an operation of the mobile station according to the embodiment.

However, it is sometimes the case that the DCD/UCD transmission of the destination base station occurs during the listening interval determined between the mobile station 200 and the source base station. For example, as illustrated in FIG. 3, if a transmitted MOB_PAG-ADV indicates the presence of data directed to the mobile station 200 (Step S218), the mobile station 200 wakes up from idle mode and reconnects to the network so as to be ready for receiving the data. Thus, during the listening interval, the mobile station 200 receives a signal from the source base station in order to receive MOB_PAG-ADV.

However, if the mobile station 200 ignores the transmitted MOB_PAG-ADV and receives the DCD/UCD of the destination base station, the mobile station 200 fails to detect the presence of data directed to the mobile station 200, and becomes late in receiving the data.

First Embodiment

According to the present embodiment, the following operation is performed in the case where the mobile station 200 is yet to receive MOB_NBR-ADV and the DCD/UCD transmission timing of the destination base station is to occur during the listening interval determined between the mobile station 200 and the source base station.

When determining that the DCD/UCD transmission timing of the destination base station is to occur during the listening interval determined together with the source base station, the mobile station 200 of the present embodiment performs the following process. Before entering the listening interval, the mobile station 200 checks with the source base station as to the presence of data directed to the mobile station 200. That is, the mobile station 200 queries the source base station whether there are data to be transmitted to the mobile station 200. If the mobile station 200 determines that there are no data directed to the mobile station 200 according to the query result, the mobile station 200 makes connection to the destination base station and then receives the DCD/UCD information. Accordingly, the mobile station 200 is able to shorten the amount of time required to initiate communication when switching the connection destination to the destination base station.

Figure 4:
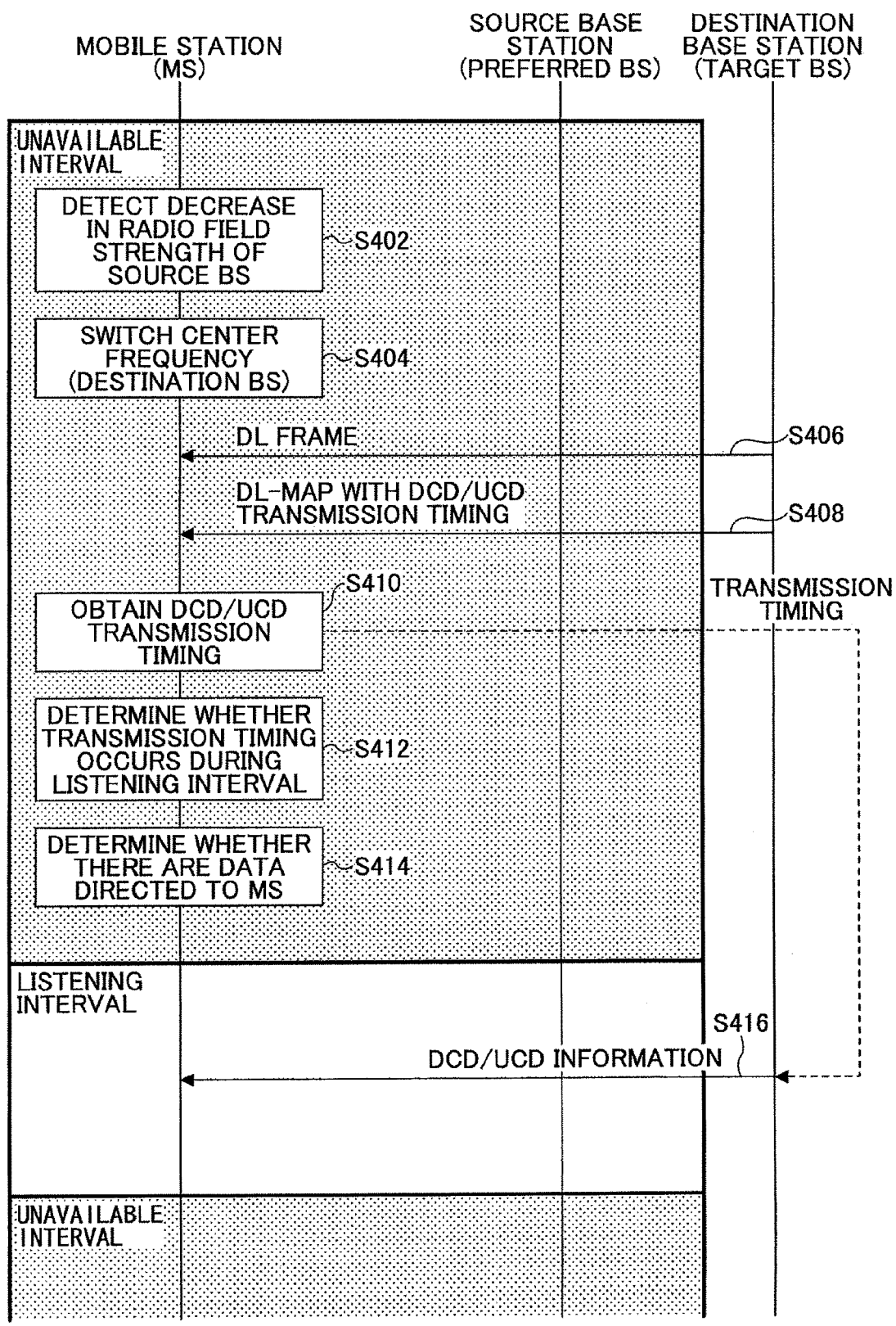
FIG. 4 is a flowchart showing an operation of the mobile station according to the embodiment.

The above-described operation is explained with reference to FIG. 4.

The mobile station 200 monitors the radio field strength of the source base station during the unavailable interval, and detects a decrease in the radio field strength (Step S402).

The mobile station 200 becomes synchronized with the destination base station by adjusting its center frequency to the frequency of the destination base station (Step S404).

The mobile station 200 refers to a frame included in a downlink signal transmitted by the destination base station (Step S406).

The mobile station 200 refers to a DL-MAP included in the downlink subframe (Step S408). The DL-MAP includes frame control information in the downlink direction. For example, the DL-MAP includes DCD/UCD transmission timing information.

The mobile station 200 obtains the DCD/UCD transmission timing information (Step S410).

The mobile station 200 checks whether the DCD/UCD transmission timing is to occur during the listening interval (Step S412).

If determining in Step S412 that the DCD/UCD transmission timing is to occur during the listening interval, the mobile station 200 checks whether there are data directed to the mobile station 200 (Step S414). That is, the mobile station 200 transmits a signal to the source base station to query whether there are data directed to the mobile station 200, and determines that there are no data directed to the mobile station 200 based on a signal sent in response to the query (the response signal includes information indicating the absence of data for the mobile station 200).

If determining in Step S414 that there are no data directed to the mobile station 200, the mobile station 200 makes connection to the destination base station at a timing specified by the obtained DCD/UCD transmission timing information. Then, the mobile station 200 receives DCD/UCD information transmitted by the destination base station (Step S416).

On the other hand, if determining that there are data directed to the mobile station 200, the mobile station 200 does not perform the operation of making connection to the destination base station at the timing specified by the obtained DCD/UCD transmission timing information, but receives MOB_PAG-ADV transmitted by the source base station during the listening interval.

Figure 5:
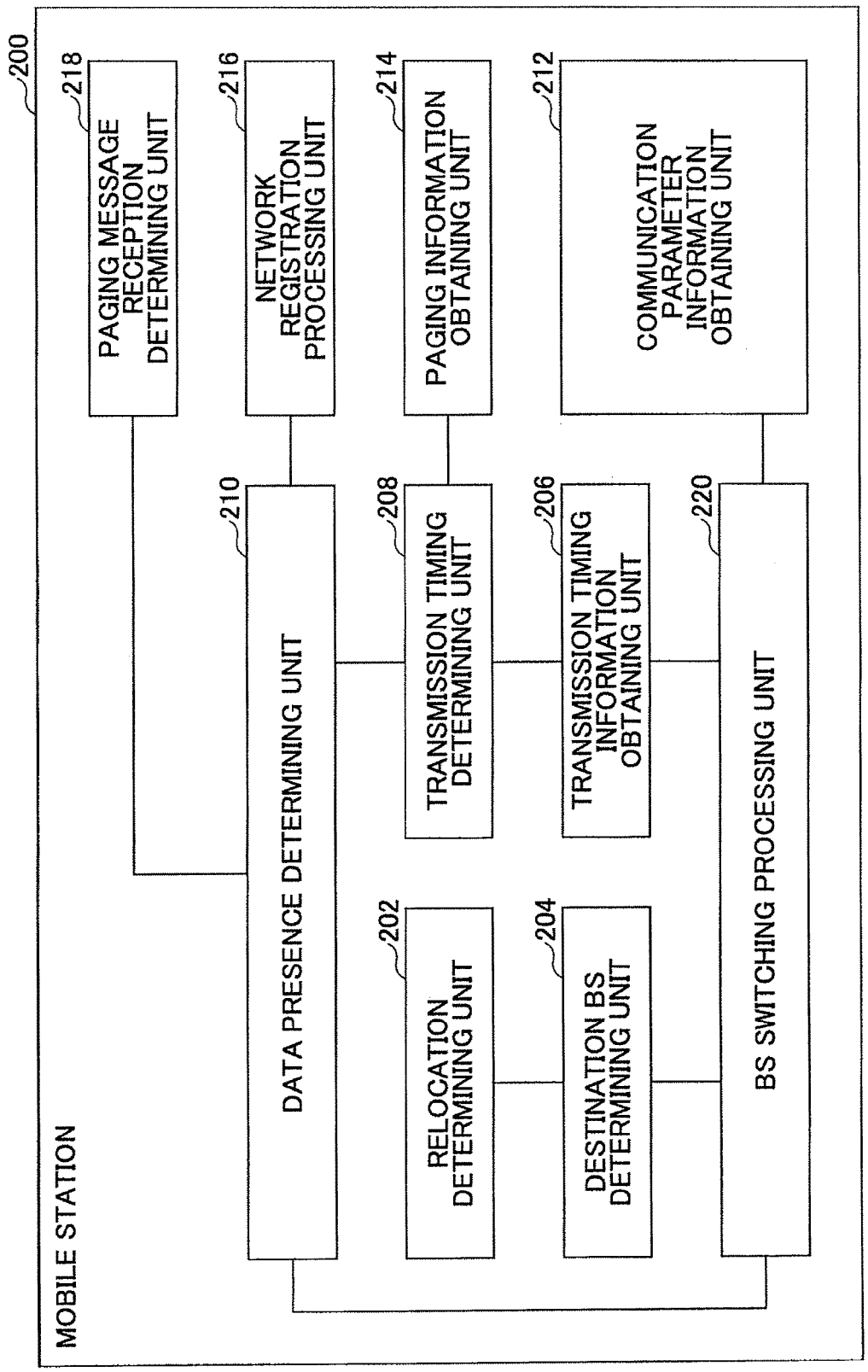
FIG. 5 is a partial block diagram of the mobile station according to the embodiment.

The mobile station 200 of the present embodiment is explained with reference to FIG. 5.

The mobile station 200 includes a relocation determining unit 202. The relocation determining unit 202 determines whether the mobile station 200 has moved to a destination base station before receiving neighboring base station information corresponding to the destination base station. For example, if the mobile station 200 is yet to receive MOB_NBR-ADV from the source base station but detects that conditions for switching to a destination base station have been satisfied, the relocation determining unit 202 may determine that the mobile station 200 has moved to a base station whose BS information the mobile station 200 is yet to receive from the source base station as the neighboring BS information.

The mobile station 200 includes a destination BS determining unit 204. If the relocation determining unit 202 determines that the mobile station 200 has moved to a base station whose BS information the mobile station 200 is yet to receive from the source base station as the neighboring BS information, the destination BS determining unit 204 determines the base station as a destination base station.

The mobile station 200 includes a transmission timing information obtaining unit 206. The transmission timing information obtaining unit 206 obtains, from the destination base station, information regarding a timing of transmitting communication parameters of the destination base station.

The mobile station 200 includes a transmission timing determining unit 208. The transmission timing determining unit 208 determines whether the timing of transmitting communication parameters of the destination base station obtained by the transmission timing information obtaining unit 206 is to occur during the listening interval determined together with the source base station.

The mobile station 200 includes a data presence determining unit 210. The data presence determining unit 210 determines based on paging information sent from the base station whether there are data directed to the mobile station 200. The data presence determining unit 210 also generates a query signal and transmits the signal to the source base station from a wireless unit, and analyzes a signal sent in response to the query signal to determine whether there are data to be transmitted to the mobile station 200.

If the source base station has yet to have data to be transmitted to the mobile station 200 ready for transmission after receiving the data from the network or the like, the source base station is able to respond to the mobile station 200 that there are no data to be transmitted, independently of transmitting the paging information. On the other hand, if the source base station has had data to be transmitted to the mobile station 200 ready for transmission after receiving the data, the source base station is able to respond to the mobile station 200 that there are data to be transmitted, independently of transmitting the paging information.

The mobile station 200 includes a communication parameter information obtaining unit 212. The communication parameter information obtaining unit 212 obtains communication parameter information transmitted by the destination base station.

The mobile station 200 includes a paging information obtaining unit 214. The paging information obtaining unit 214 obtains information on the listening interval and unavailable intervals determined between the mobile station 200 and the source base station.

The mobile station 200 includes a network registration processing unit 216. In the case where the data presence determining unit 210 determines based on the paging information that there are data directed to the mobile station 200, the network registration processing unit 216 registers the mobile station 200 with the network. The mobile station 200 includes a paging message reception determining unit 218. The paging message reception determining unit 218 determines whether the mobile station 200 has received from the source base station a paging message indicating the presence or absence of data directed to the mobile station 200.

The mobile station 200 includes a BS switch processing unit 220. The BS switch processing unit 220 switches the connection destination between base stations.

Next is described an operation of the mobile station 200 according the present embodiment.

(1) The relocating determining unit 202 collects information on conditions for switching the connection destination to a base station. If the switching conditions of the base station are satisfied and the mobile station 200 has yet to receive MOB_NBR-ADV, the relocating determining unit 202 requests the destination BS determining unit 204 to determine the base station as a destination base station.

(2) The destination BS determining unit 204 determines the base station as a destination base station according to determination conditions. Then, the destination BS determining unit 204 requests the BS switch processing unit 220 to make connection to the destination base station.

(3) The BS switch processing unit 220 adjusts the center frequency of the mobile station 200 to the frequency of the destination base station. As a result, the connection destination is switched to the destination base station.

(4) After the mobile station 200 is connected to the destination base station, the transmission timing information obtaining unit 206 refers to a frame transmitted from the destination base station, and obtains communication-parameter transmission timing information included in the frame. The transmission timing information obtaining unit 206 then requests the BS switch processing unit 220 to make connection to the source base station.

(5) The BS switch processing unit 220 adjusts the center frequency of the mobile station 200 to the frequency of the source base station, thereby changing the connection destination to the source base station.

(6) Based on the communication-parameter transmission timing information obtained by the transmission timing information obtaining unit 206, the transmission timing determining unit 208 determines whether the communication parameters of the destination base station are to be transmitted during the listening interval determined between the mobile station 200 and the source base station. If the communication parameters of the destination base station are transmitted during the listening interval, the transmission timing determining unit 208 requests the data presence determining unit 210 to determine whether there are data directed to the mobile station 200.

(7) The data presence determining unit 210 checks with the source base station as to the presence or absence of data directed to the mobile station 200. This check may be performed prior to the above determination regarding whether the communication parameters of the destination base station are to be transmitted during the listening interval. For example, when the mobile station 200 is in idle mode, the data presence determining unit 210 may query the source base station at fixed intervals to determine whether there are data directed to the mobile station 200. When there are no data directed to the mobile station 220, the data presence determining unit 210 requests the BS switch processing unit 220 to make connection to the destination base station according to the timing at which the communication parameters of the destination base station are transmitted.

(8) The BS switch processing unit 220 adjusts the center frequency of the mobile station 200 to the frequency of the destination base station, thereby changing the connection destination to the destination base station.

(9) The communication parameter information obtaining unit 212 refers to a frame transmitted by the destination base station and obtains DCD/UCD information included in the frame. Then, the communication parameter information obtaining unit 212 requests the BS switch processing unit 220 to make connection to the source base station.

(10) The BS switch processing unit 220 adjusts the center frequency of the mobile station 200 to the frequency of the source base station, thereby switching the connection destination to the source base station.

According to the above-described operation, even if the mobile station 200 has a degraded connection to the source base station and switches the connection destination to the destination base station before receiving MOB_NBR-ADV, the mobile station 200 has already obtained the DCD/UCD information of the destination base station. Therefore, the mobile station 200 is able to immediately initiate communication with the destination base station without waiting for the DCD/UCD information to be distributed from the destination base station.

Next is described another operation of the mobile station 200 according the present embodiment.

This operation of the mobile station 200 differs from the above-described operation in the processes (6) and (7).

(6) Based on the communication-parameter transmission timing information obtained by the transmission timing information obtaining unit 206, the transmission timing determining unit 208 determines whether the communication parameters of the destination base station are to be transmitted during the listening interval determined between the mobile station 200 and the source base station. If the communication parameters of the destination base station are transmitted during the listening interval, the transmission timing determining unit 208 requests the paging information obtaining unit 214 to obtain a start timing of the listening interval determined between the mobile station 200 and the source base station. Then, the transmission timing determining unit 208 reports to the data presence determining unit 210 of the start timing of the listening interval obtained by the paging information obtaining unit 214.

(7) Immediately before the start of the listening interval reported by the transmission timing determining unit 208, the data presence determining unit 210 checks with the source base station as to whether there are data directed to the mobile station 200. In the case where there are no data directed to the mobile station 200, the data presence determining unit 210 requests the BS switch processing unit 220 to make connection to the destination base station according to the timing at which the communication parameters of the destination base station are transmitted.

Subsequently, the processes (8) through (10) described above are carried out.

According to the above-described operation, the process of determining (querying) whether there are data directed to the mobile station 200 can be delayed until immediately before the start of communication with the source base station during the listening interval. As a result, it is possible to determine the presence or absence of data directed to the mobile station 200 based on new information. In addition, the mobile station 200 is able to more accurately determine whether to receive the DCD/UCD information of the destination base station during the listening interval.

Next is described another operation of the mobile station 200 according the present embodiment.

This operation of the mobile station 200 differs from the above-described operation in the processes from (6) onward.

(6) The transmission timing information obtaining unit 206 requests the BS switch processing unit 220 to make connection to the destination base station according to the timing at which the communication parameters of the destination base station are transmitted.

(7) The BS switch processing unit 220 adjusts the center frequency of the mobile station 200 to the frequency of the destination base station, thereby switching the connection destination to the destination base station.

(8) The communication parameter information obtaining unit 212 refers to a frame transmitted by the destination base station and obtains DCD/UCD information included in the frame. Then, the communication parameter information obtaining unit 212 requests the BS switch processing unit 220 to make connection to the source base station.

(9) The BS switch processing unit 220 adjusts the center frequency of the mobile station 200 to the frequency of the source base station, thereby switching the connection destination to the source base station.

(10) The transmission timing determining unit 208 determines whether the communication parameters of the destination base station are to be transmitted during the listening interval determined between the mobile station 200 and the source base station. If the communication parameters of the destination base station are to be transmitted during the listening interval, the transmission timing determining unit 208 requests the data presence determining unit 210 to determine whether there are data directed to the mobile station 200.

(11) The data presence determining unit 210 checks with the source base station as to the presence or absence of data directed to the mobile station 200. If there are data directed to the mobile station 200, the data presence determining unit 210 requests the network registration processing unit 216 to register the mobile station 200 with the network.

(12) The network registration processing unit 216 performs a network registration process with respect to the source base station. As a result, the mobile station 200 becomes ready for receiving data directed to the mobile station 200.

Thus, the process of determining where there are data directed to the mobile station 200 is performed after the acquisition of the DCD/UCD information. Accordingly, even if there are data directed to the mobile station 200, the mobile station 200 is able to obtain the DCD/UCD information of the destination base station. In addition, the mobile station 200 autonomously performs the network registration process, thereby being also able to receive data directed to the mobile station 200.

Next is described another operation of the mobile station 200 according the present embodiment.

This operation of the mobile station 200 differs from the above-described operation in the processes from (6) onward.

(6) The transmission timing information obtaining unit 206 requests the BS switch processing unit 220 to make connection to the destination base station according to the timing at which the communication parameters of the destination base station are transmitted.

(7) The BS switch processing unit 220 adjusts the center frequency of the mobile station 200 to the frequency of the destination base station, thereby switching the connection destination to the destination base station.

(8) The communication parameter information obtaining unit 212 refers to a frame transmitted by the destination base station and obtains DCD/UCD information included in the frame. Then, the communication parameter information obtaining unit 212 requests the BS switch processing unit 220 to make connection to the source base station.

(9) The BS switch processing unit 220 adjusts the center frequency of the mobile station 200 to the frequency of the source base station, thereby switching the connection destination to the source base station.

(10) The transmission timing determining unit 208 requests the paging information obtaining unit 214 to obtain an end timing of the listening interval determined between the mobile station 200 and the source base station.

(11) The transmission timing determining unit 208 reports, to the data presence determining unit 210, the end timing of the listening interval obtained by the paging information obtaining unit 214.

(12) The data presence determining unit 210 requests the paging message reception determining unit 218 to determine whether a paging message has been received according to the timing at which the reported listening interval ends.

(13) The paging message reception determining unit 218 determines whether a paging message has been received. If the paging message reception determining unit 218 determines that a paging message has not been received, the data presence determining unit 210 checks with the source base station as to whether there are data directed to the mobile station 200. On the other hand, if the paging message reception determining unit 218 determines that a paging message has been received, the data presence determining unit 210 requests the network registration processing unit 216 to register the mobile station 200 with the network.

(14) The network registration processing unit 216 performs the network registration process with respect to the source base station. As a result, the mobile station 200 becomes ready for receiving the data directed to the mobile station 200.

According to the above-described operation, the process of determining whether there are data directed to the mobile station 200 can be delayed until immediately before the end of the listening interval. Accordingly, if the mobile station 200 receives MOB_PAG-ADV during the period between after the reception of the DCD/UCD information of the destination base station and the end of the listening interval, the mobile station 200 is able to check the presence or absence of data directed to the mobile station 200 without checking it with the source base station. In this way, it is possible to save a communication band between the mobile station 200 and the source base station.

Second Embodiment

Next is described the mobile station 200 according to the second embodiment of the present disclosure.

The mobile station 200 performs an operation different from the operation described above in the first embodiment, and specifically, the difference is in the procedures of the data presence determining unit 210 for checking with the source base station as to whether there are data directed to the mobile station 200.

The mobile station 200 of the second embodiment updates its location information (location update) with respect to the source base station. The mobile station 200 then determines whether there are data directed to the mobile station 200 based on a parameter included in a response to the location update and indicating the presence or absence of data directed to the mobile station 200.

Figure 6:
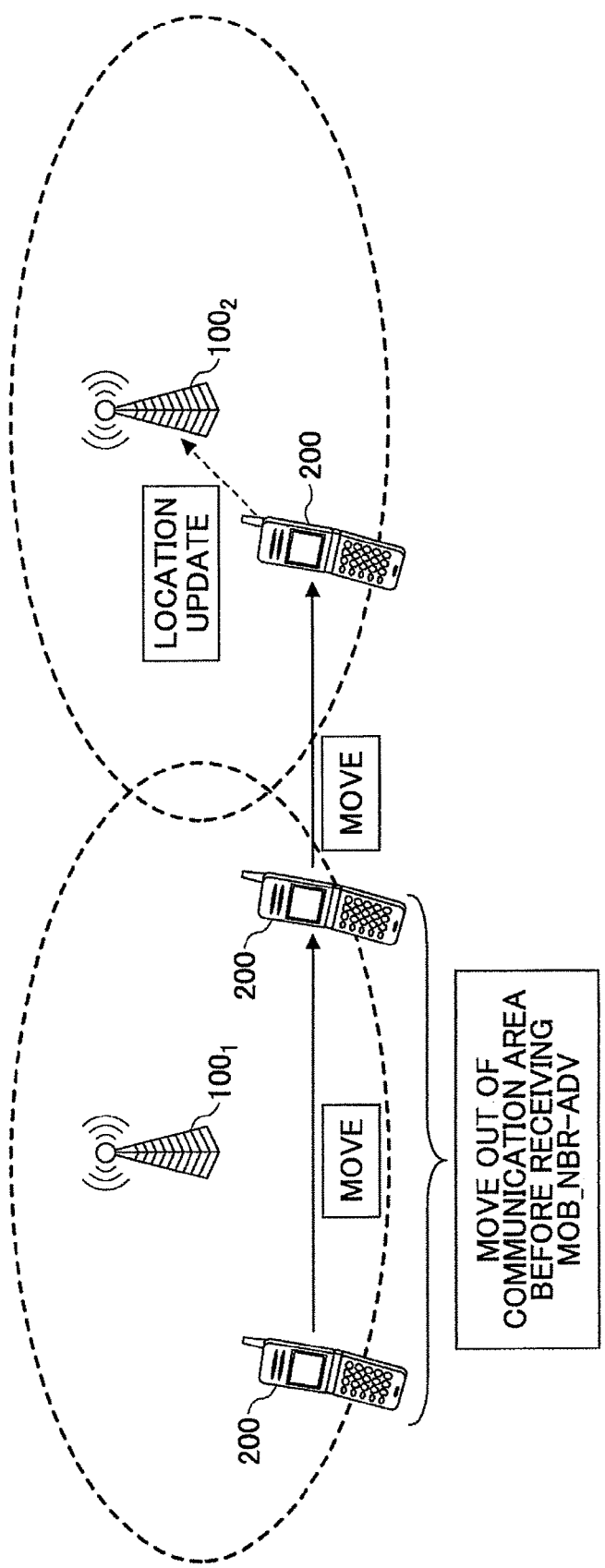
FIG. 6 is an illustration showing a system according to another embodiment.

The communications system according to the present embodiment is explained with reference to FIG. 6.

The communications system includes the mobile station 200, and may include multiple mobile stations. The communications system includes base stations 100 ($100_1$ and $100_2$), and may include three or more base stations.

Assume that the mobile station 200 located in the communication area of the base station $100_1$ moves to the communication area of the base station $100_2$ before receiving MOB_NBR-ADV from the base station $100_1$. Also, the mobile station 200 monitors the strength of a signal received from the base station $100_1$. The received signal strength may include an RSSI (Received Signal Strength Indicator). If the signal/noise ratio (the ratio of the noise to the received signal) becomes small, the mobile station 200 switches the communication destination to the base station $100_2$. The signal/noise ratio may include a CINR (Carrier to Interference plus Noise Ratio)

As in the first embodiment above, the present embodiment explains as an example a case in which WiMAX is applied to a communications system. In the communications system to which WiMAX is applied, the mobile station 200 and the base stations 100 perform communication based on the specifications of the IEEE802.16e standard. The present embodiment is described with an example in which the base station $100_1$ has a center frequency of 2498.5 MHz and a band width of 5 MHz and the base station $100_2$ has a center frequency of 2503.5 MHz and a band width of 5 MHz.

Figure 7:
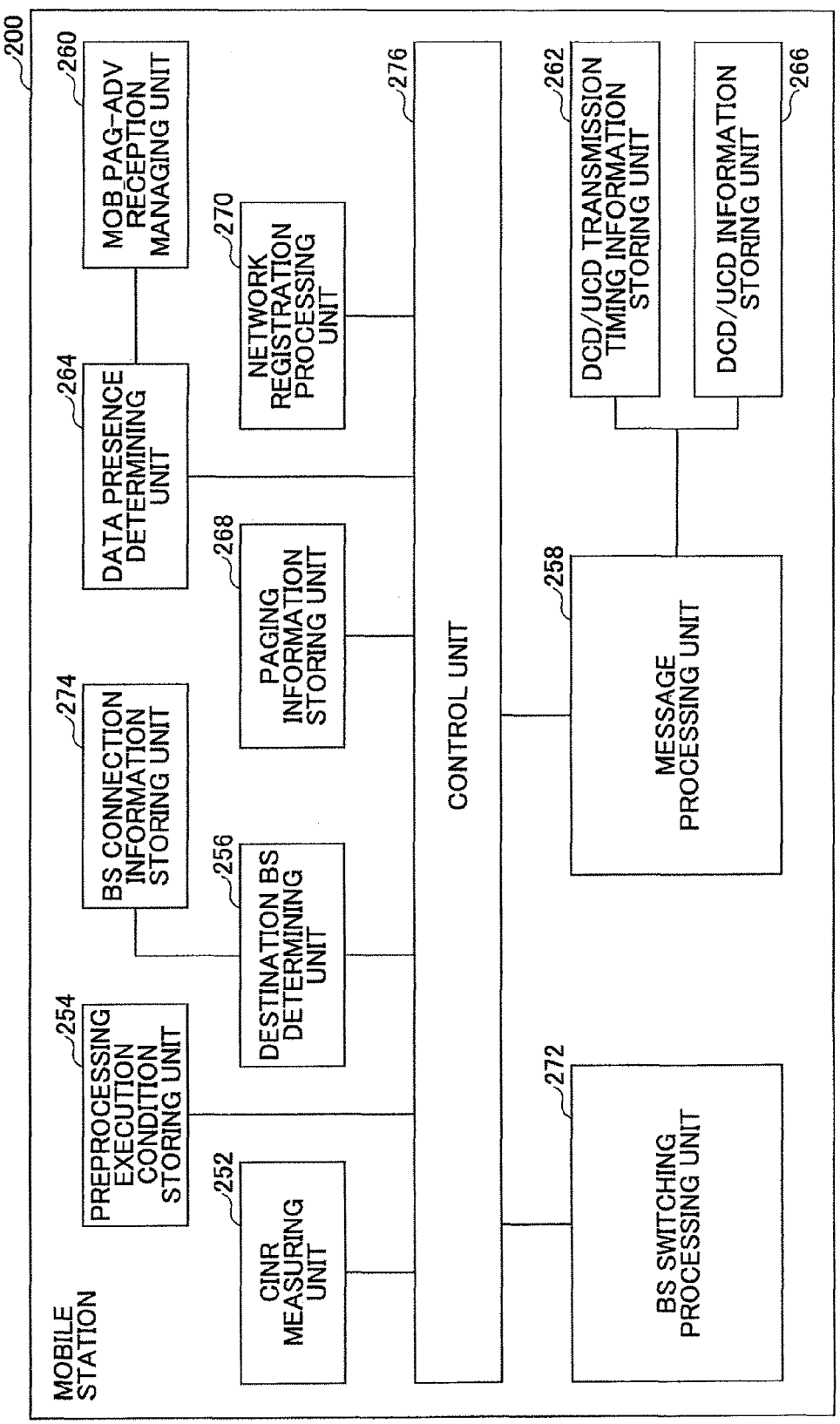
FIG. 7 is a partial block diagram of a mobile station according to the embodiment.

The mobile station 200 of the present embodiment is described with reference to FIG. 7.

The mobile station 200 includes a CINR measuring unit 252. The CINR measuring unit 252 measures an RSSI value and a noise component of the base station $100_1$. The measurement may be made at fixed intervals, or may be made at random times. Then, the CINR measuring unit 252 calculates a CINR value. The CINR measuring unit 252 inputs the calculated CINR value to a control unit 276 to be described later.

The mobile station 200 includes a preprocessing execution condition storing unit 254. The preprocessing execution condition storing unit 254 stores conditions of a preprocessing operation executed when the mobile station 200 moves from one base station 100 to another. The preprocessing conditions include conditions for executing a process of obtaining DCD/UCD information of a destination base station 100. For example, the conditions for executing the preprocessing operation may include a MOB_NBR-ADV reception status and a CINR threshold, as illustrated in FIG. 8. According to the example of FIG. 8, the preprocessing operation is executed when MOB_NBR-ADV is yet to be received and the CINR value becomes less than 20 [db].

The mobile station 200 includes a destination BS determining unit 256. According to an instruction issued by the control unit 276, the destination BS determining unit 256 determines a destination base station 100 based on base station connection information stored in a BS connection information storing unit 274 to be described later.

The mobile station 200 includes a message processing unit 258. The message processing unit 258 analyzes a control message issued by a base station 100.

The mobile station 200 includes an MOB_PAG-ADV reception managing unit 260. The MOB_PAG-ADV reception managing unit 260 manages whether MOB_PAG-ADV has been received during the listening interval. For example, the MOB_PAG-ADV reception managing unit 260 has an MOB_PAG-ADV reception status, as illustrated in FIG. 9.

The mobile station 200 includes a DCD/UCD transmission timing information storing unit 262. The transmission timing information storing unit 262 has transmission timing information included in DCD/UCD information received from the destination base station 100. For example, the transmission timing information may be the frame number of a frame used for transmitting the DCD/UCD information.

The mobile station 200 includes a data presence determining unit 264. The data presence determining unit 264 queries the source base station whether there are data directed to the mobile station 200. For example, the mobile station 200 located in the coverage area of the base station $100_1$ updates its location information (location update) with respect to the base station $100_1$ based on the IEEE802.16e standard. Or the mobile station 200 may transmit a ranging request (RNG-REQ) to the base station $100_1$. Then, based on a ranging response (RNG-RSP) transmitted by the base station $100_1$, the mobile station 200 may determine the presence or absence of data directed to the mobile station 200. Accordingly, the mobile station 200 is able to query whether there are data directed to the mobile station 200.

The mobile station 200 includes a DCD/UCD information storing unit 266. The DCD/UCD information storing unit 266 stores DCD/UCD information transmitted by the base station $100_2$.

The mobile station 200 includes a paging information storing unit 268. The paging information storing unit 268 manages frame numbers corresponding the start and end of the listening interval when the mobile station 200 is in idle mode.

The mobile station 200 includes a network registration processing unit 270. The network registration processing unit 270 performs a network registration process with respect to a currently connected base station 100.

The mobile station 200 includes a BS switch processing unit 272. The BS switch processing unit 272 switches the connection destination from one base station 100 to another. Specifically, the BS switch processing unit 272 sets the center frequency and band width of the mobile station 200 to specified values.

The mobile station 200 includes a BS connection information storing unit 274. The BS connection information storing unit 274 stores information used for making connection to base stations 100. For example, such information includes the center frequencies and band widths of the base stations 100. Center frequencies and band widths used in the operation may be determined at the time of startup by a manager, for example.

The mobile station 200 includes the control unit 276. Based on a processing result of each of the above-described components, the control unit 276 determines a process to be executed next. Then, the control unit 276 requests a unit which is going to execute a process next to execute the process.

The mobile station 200 may include, among the components of the mobile station 200 described with reference to FIG. 7, the CINR measuring unit 252, the preprocessing execution condition storing unit 254, the message processing unit 258, the DCD/UCD transmission timing information storing unit 262, the data presence determining unit 264, the DCD/UCD information storing unit 266, the paging information storing unit 268, the BS switch processing unit 272, the BS connection information storing unit 274 and the control unit 276.

Figure 10:
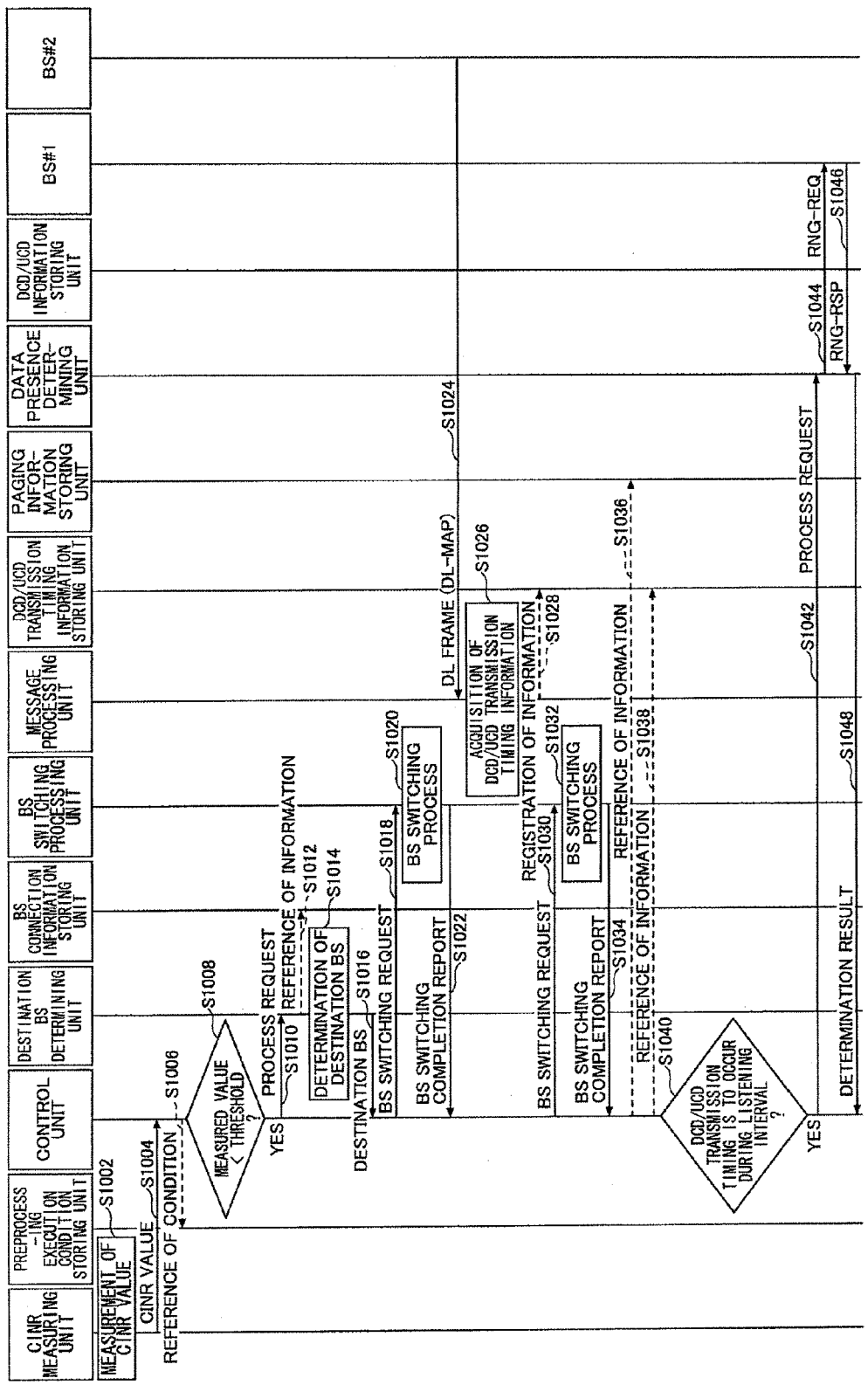
FIG. 10 is a flowchart showing an operation of the mobile station according to the embodiment.
Figure 11:
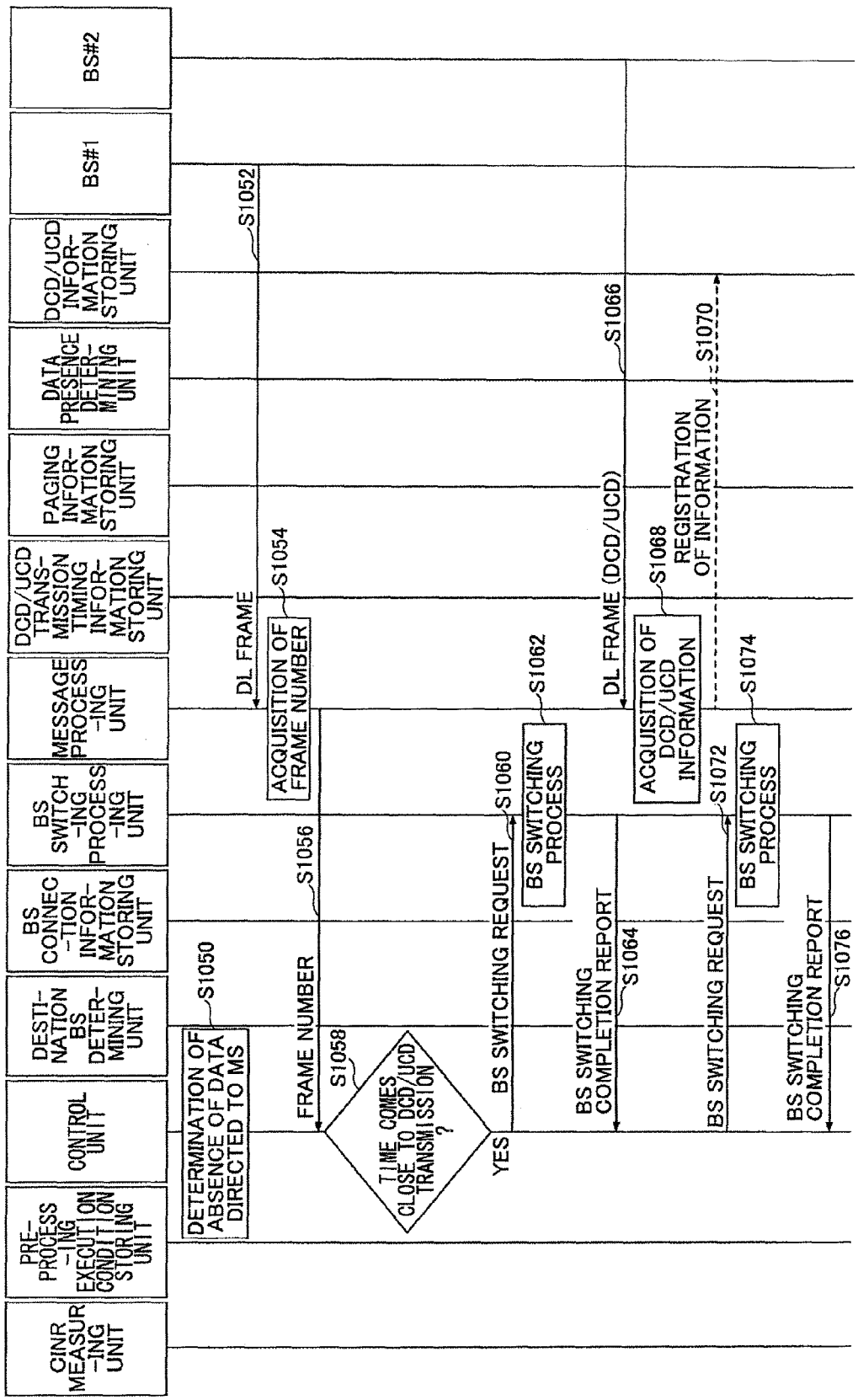
FIG. 11 is a flowchart showing the operation of the mobile station according to the embodiment.

The operation of the mobile station 200 is described with reference to FIGS. 10 and 11.

The preprocessing execution condition storing unit 254 has in advance information on conditions of a preprocessing operation executed when the mobile station 200 moves from one base station 100 to another. Such conditions may be, for example, assigned by a manager using commands or assigned by a report issued by the base station $100_1$. For example, the preprocessing operation may be executed if the CINR value becomes less than 20 [db], as described above with reference to FIG. 8.

The BS connection information storing unit 274 has in advance information used for making connection to base stations 100. The information may include center frequencies and band widths of the base stations 100. Such information may be, for example, assigned by the manager using commands or assigned by reports issued by the base stations 100. For example, the base station $100_1$ has a center frequency of 2498.5 MHz and a band width of 5 MHz and the base station $100_2$ has a center frequency of 2503.5 MHz and a band width of 5 MHz, as illustrated in FIG. 12.

The paging information storing unit 268 manages frame numbers of the start and end frames of the listening interval and the unavailable interval included in paging information, which is obtained by a protocol with the base station $100_1$ when the mobile station 200 enters idle mode. For example, as illustrated in FIG. 13, the paging information storing unit 268 may store the numbers of the start and end frames of the listening interval. According to the example of FIG. 13, the numbers of the start and end frames of the listening interval are 27 and 32, respectively.

The CINR measuring unit 252 measures an RSSI value and a noise component of the base station $100_1$ and calculates a CINR value (Step S1002). This step may be performed at fixed intervals or at random times. Assume here that the CINR value calculated by the CINR measuring unit 252 is 15 [db]. In this case, the CINR measuring unit 252 reports the CINR value to the control unit 276 (Step S1004).

The control unit 276 refers to the CINR threshold, 20 [db], stored in the preprocessing execution condition storing unit 254 (Step S1006). The control unit 276 then compares the CINR value received from the CINR measuring unit 252 and the CINR threshold stored in the preprocessing execution condition storing unit 254 (Step S1008).

If the CINR value is smaller than the threshold (Step S1008: YES), the control unit 276 requests the destination BS determining unit 256 to perform its processing operation (Step S1010). The destination BS determining unit 256 refers to information stored in the BS connection information storing unit 274 (Step S1012). In the mobile station 200 connected to the base station $100_1$, the destination BS determining unit 256 determines a base station having the second highest selection priority as the destination base station. For example, the destination BS determining unit 256 obtains parameters necessary for making connection to the destination base station $100_2$. Then, the destination BS determining unit 256 inputs the parameters related to the destination base station $100_2$ to the control unit 276. According to the example of FIG. 12, the base station $100_2$ having a center frequency of 2503.5 MHz is selected as the base station having the second highest selection priority. If the CINR value is smaller than the threshold and the mobile station 200 is yet to receive MOB_NBR-ADV, the destination BS determining unit 256 determines that the preprocessing execution conditions are satisfied. In this case, the destination BS determining unit 256 determines the base station $100_2$ as the destination base station (Step S1014), and reports the destination base station $100_2$ to the control unit 276 (Step S1016).

In order to make connection to the destination base station $100_2$, the control unit 276 places a BS switching request to the BS switch processing unit 272 (Step S1018). The BS switching request may include the center frequency and the band width of the destination base station $100_2$. For example, the BS switching request includes a center frequency of 2503.5 MHz and a band width of 5 MHz. The BS switch processing unit 272 sets the center frequency and band width of the mobile station 200 to the specified ones, thereby making connection to the base station $100_2$ (Step S1020). The BS switch processing unit 272 sends a BS switching completion report to the control unit 276 (Step S1022).

The mobile station 200 receives a downlink signal transmitted by the base station $100_2$ (Step S1024). The downlink signal includes a DL-MAP. The message processing unit 258 analyzes the frame of the downlink signal. For example, the message processing unit 258 obtains timing information indicating the timing of transmitting the DCD/UCD information (Step S1026). The message processing unit 258 may obtain, for example, the frame number of the frame used for transmitting the DCD/UCD information. The message processing unit 258 stores the obtained timing information indicating the timing of transmitting the DCD/UCD information in the DCD/UCD transmission timing information storing unit 262 (Step S1028). The present embodiment takes an example in which the frame number of the frame used for transmitting the DCD/UCD information is 30, as illustrated in FIG. 14.

The control unit 276 may make connection to the source base station $100_1$ until the time comes at which the frame used to transmit the DCD/UCD information from the destination base station $100_2$ is transmitted. In this case, the control unit 276 places a BS switching request to the BS switch processing unit 272 in order to make connection to the source base station $100_1$ (Step S1030). The BS switching request may include the center frequency and band width of the source base station $100_1$. Specifically, the BS switching request includes a center frequency of 2498.5 MHz and a band width of 5 MHz. The BS switch processing unit 272 sets the center frequency and band width of the mobile station 200 to the specified ones, thereby making connection to the source base station $100_1$ (Step S1032). The BS switch processing unit 272 sends a BS switching completion report to the control unit 276 (Step S1034). Thus, by switching the connection destination back to the source base station $100_1$, other processes can be performed if there is time until the frame used to transmit the DCD/UCD information is transmitted. If there is no time until the frame used to transmit the DCD/UCD information is transmitted, the control unit 276 may keep the connection with the destination base station $100_2$.

The control unit 276 refers to the numbers of the start and end frames of the listening interval stored in the paging information storing unit 268 (Step S1036). The control unit 276 then refers to the number of the DCD/UCD transmission frame stored in the DCD/UCD transmission timing information storing unit 262 (Step S1038).

The control unit 276 compares the numbers of the start and end frames of the listening interval and the number of the DCD/UCD transmission frame (Step S1040). The control unit 276 determines whether the timing at which the destination base station $100_2$ transmits the DCD/UCD information is to occur during the listening interval.

If the timing at which the destination base station $100_2$ transmits the DCD/UCD information is to occur during the listening interval (Step S1040: YES), the control unit 276 requests the data presence determining unit 264 to determine whether there are data directed to the mobile station 200 (Step S1042).

In the present embodiment, for example, the mobile station 200 updates its location information (location update) with respect to the source base station $100_1$ based on the IEEE802.16e standard (Step S1044). The mobile station 200 may transmit a ranging request (RNG-REQ) to the source base station $100_1$. Then, based on a ranging response (RNG-RSP) transmitted by the base station $100_1$, the mobile station 200 may determine the presence or absence of data directed to the mobile station (Step S1046). For example, the ranging response (RNG-RSP) includes a field indicating the presence or absence of data directed to the mobile station 200. The data presence determining unit 246 refers to the field so as to determine the presence or absence of data directed to the mobile station 200. As a result of the location update, the data presence determining unit 264 determines the absence of data directed to the mobile station 200, and sends the result to the control unit 276 (Step S1048).

Since it is understood based on the result sent from the data presence determining unit 264 that there are no data directed to the mobile station 200, the control unit 276 determines to give priority to receiving the DCD/UCD information of the base station $100_2$ during the listening interval (Step S1050).

The mobile station 200 receives a downlink signal (Step S1052). The message processing unit 258 obtains a frame number included in the downlink signal (Step S1054). The message processing unit 258 inputs the obtained frame number to the control unit 276 (Step S1056).

The control unit 276 detects that the time comes close to the transmission timing of the DCD/UCD information of the destination base station $100_2$ (Step S1058: YES). The control unit 276 places a BS switching request to the BS switch processing unit 272 in order to make connection to the destination base station $100_2$ (Step S1060). The BS switching request may include the center frequency and band width of the destination base station $100_2$. Specifically, the BS switching request includes a center frequency of 2503.5 MHz and a band width of 5 MHz. The BS switch processing unit 272 sets the center frequency and band width of the mobile station 200 to the specified ones, thereby connecting to the destination base station $100_2$ (Step S1062). The BS switch processing unit 272 sends a BS switching completion report to the control unit 276 (Step S1064). Instead of detecting that the time comes close to the transmission timing of the DCD/UCD information, the elapsed time since the transmission frame number of the DCD/UCD information is obtained may be measured, or the frame number may be checked each time a frame is received, for example.

The mobile station 200 receives a downlink signal (Step S1066). The message processing unit 258 obtains DCD/UCD information included in the downlink signal (Step S1068). The message processing unit 258 stores the obtained DCD/UCD information in the DCD/UCD information storing unit 266 (Step S1070).

The control unit 276 places a BS switching request to the BS switch processing unit 272 in order to make connection to the destination base station $100_1$ (Step S1072). The BS switching request may include the center frequency and band width of the destination base station $100_1$. Specifically, the BS switching request includes a center frequency of 2498.5 MHz and a band width of 5 MHz. The BS switch processing unit 272 sets the center frequency and band width of the mobile station 200 to the specified ones, thereby connecting to the destination base station $100_1$ (Step S1074). The BS switch processing unit 272 sends a BS switching completion report to the control unit 276 (Step S1076).

Next is described the first modification of the mobile station 200 of the second embodiment.

The modified mobile station 200 includes, among the components of the mobile station 200 described with reference to FIG. 7, the CINR measuring unit 252, the preprocessing execution condition storing unit 254, the message processing unit 258, the DCD/UCD transmission timing information storing unit 262, the data presence determining unit 264, the DCD/UCD information storing unit 266, the paging information storing unit 268, the BS switch processing unit 272, the BS connection information storing unit 274 and the control unit 276.

Figure 15:
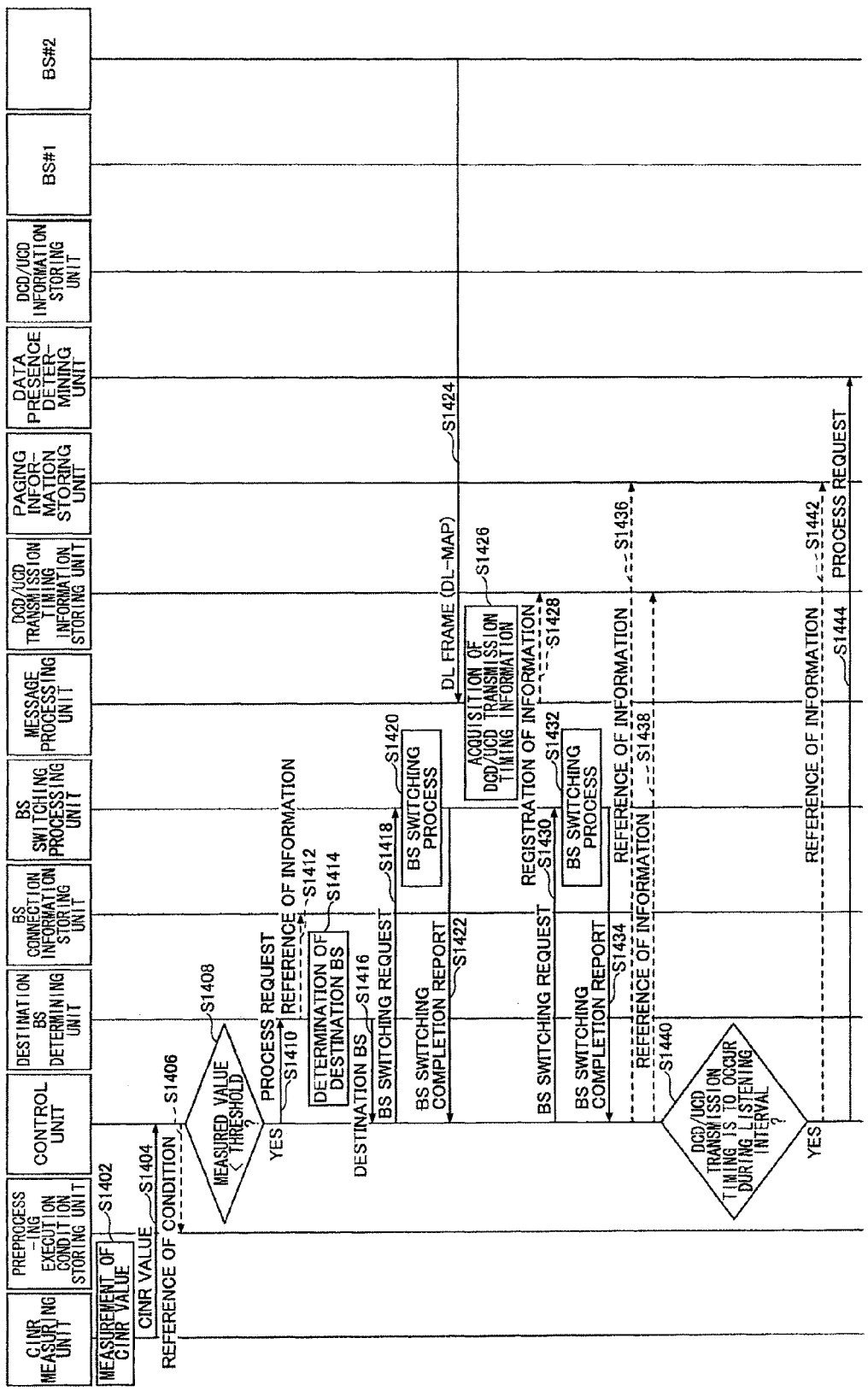
FIG. 15 is a flowchart showing an operation of a mobile station according to one modification.
Figure 16:
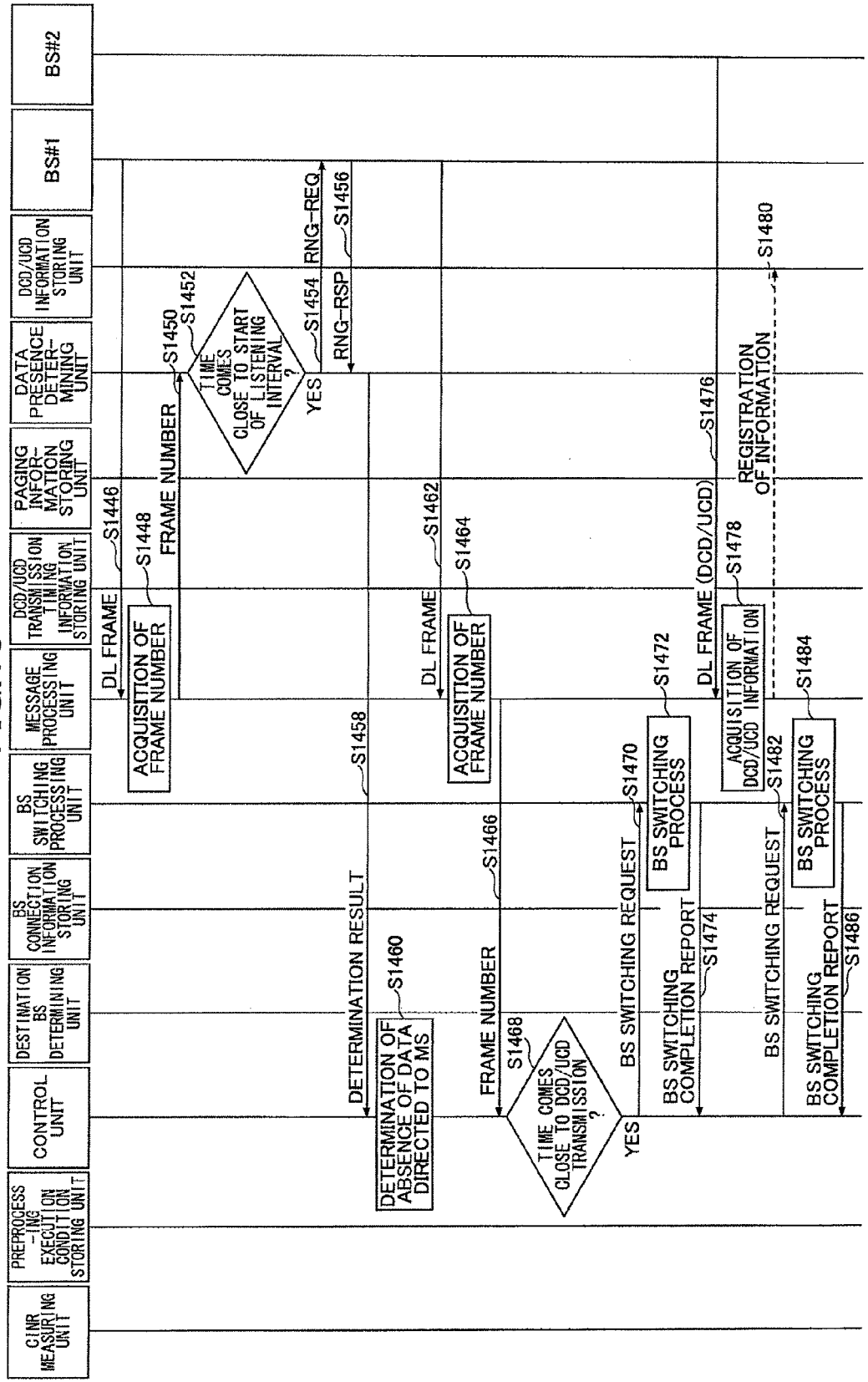
FIG. 16 is a flowchart showing the operation of the mobile station according to the modification.

The operation of the mobile station 200 of the present modification is described with reference to FIGS. 15 and 16.

In the operation of the mobile station 200 according to the present modification, Steps S1402 through S1440 are the same as Steps S1002 through S1040 described above with reference to FIG. 10.

In the case where the timing at which the base station $100_2$ transmits the DCD/UCD information is to occur during the listening interval (Step S1440), the control unit 276 refers to the numbers of the start and end frames of the listening interval stored in the paging information storing unit 268 (Step S1442). The control unit 276 requests the data presence determining unit 264 to determine whether there are data directed to the mobile station 200 (Step S1444). At this point, the control unit 276 may report the numbers of the start and end frames of the listening interval to the data presence determining unit 264.

The mobile station 200 receives a downlink signal (Step S1446). The message processing unit 258 obtains a frame number included in the downlink signal (Step S1448). The message processing unit 258 inputs the obtained frame number to the data presence determining unit 264 (Step S1450).

The data presence determining unit 264 waits until the time comes close to the start of the listening interval. The data presence determining unit 264 determines based on the received frame number whether the time comes close to the start of the listening interval (Step S1452). Instead of detecting that the time comes close to the start of the listening interval, the elapsed time since the frame number of the start of the listening interval is obtained may be measured, or the frame number may be checked each time a frame is received, for example.

When the time comes close to the start of the listening interval, the data presence determining unit 264 updates its location information (location update) with respect to the base station $100_1$ based on the IEEE802.16e standard, for example (Step S1454). The mobile station 200 may transmit a ranging request (RNG-REQ) to the base station $100_1$. Then, based on a ranging response (RNG-RSP) transmitted by the base station $100_1$, the mobile station 200 may determine the presence or absence of data directed to the mobile station (Step S1456). As a result of the location update, the data presence determining unit 264 determines the absence of data directed to the mobile station 200, and sends the result to the control unit 276 (Step S1458).

Subsequently, Steps S1460 through S1486 of the present modification are the same as Steps S1050 through S1076 described with reference to FIG. 10.

Next is described the second modification of the mobile station 200 of the second embodiment.

The modified mobile station 200 includes, among the components of the mobile station 200 described with reference to FIG. 7, the CINR measuring unit 252, the preprocessing execution condition storing unit 254, the message processing unit 258, the DCD/UCD transmission timing information storing unit 262, the data presence determining unit 264, the DCD/UCD information storing unit 266, the paging information storing unit 268, the network registration processing unit 270, the BS switch processing unit 272, the BS connection information storing unit 274 and the control unit 276.

Figure 17:
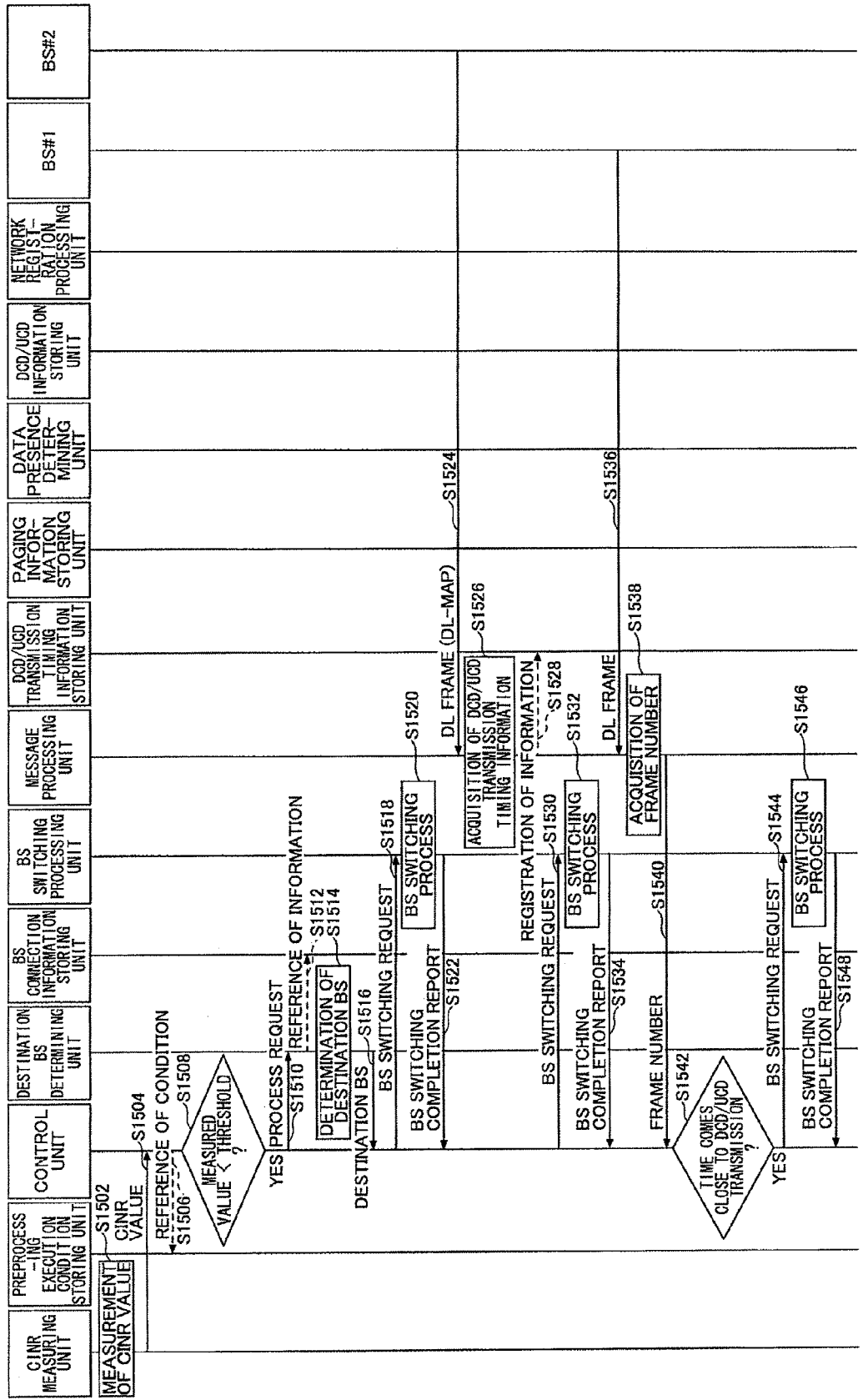
FIG. 17 is a flowchart showing an operation of a mobile station according to another modification.
Figure 18:
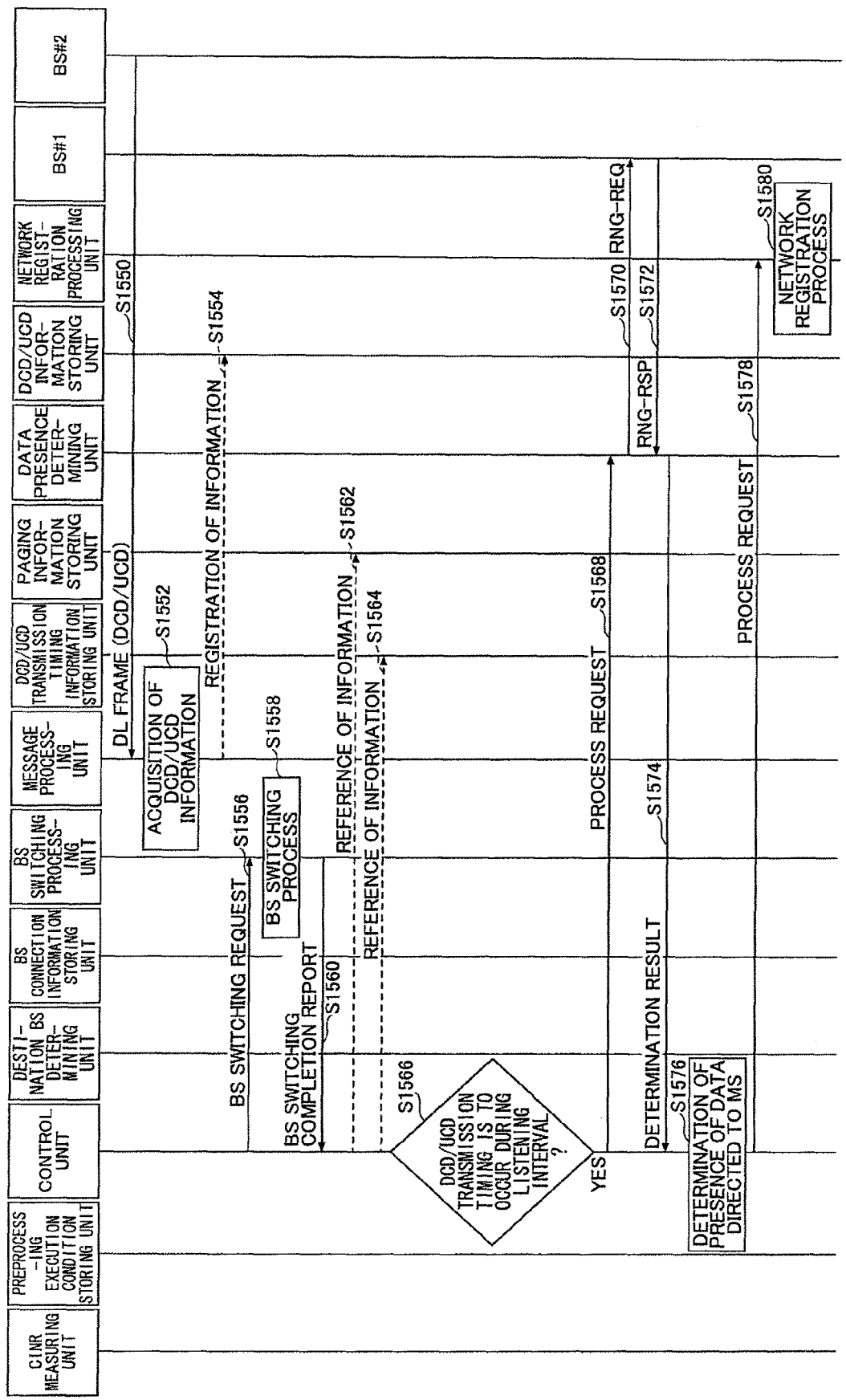
FIG. 18 is a flowchart showing the operation of the mobile station according to the modification.

The operation of the mobile station 200 of the present modification is described with reference to FIGS. 17 and 18.

In the operation of the mobile station 200 according to the present modification, Steps S1502 through S1534 are the same as Steps S1002 through S1034 described above with reference to FIG. 10.

The mobile station 200 receives a downlink signal (Step S1536). The message processing unit 258 obtains a frame number included in the downlink signal (Step S1538). The message processing unit 258 inputs the obtained frame number to the control unit 276 (Step S1540).

The control unit 276 detects that the time comes close to the transmission timing of the DCD/UCD information of the destination base station $100_2$ (Step S1542: YES). The control unit 276 places a BS switching request to the BS switch processing unit 272 in order to make connection to the destination base station $100_2$ (Step S1544). The BS switching request may include the center frequency and band width of the destination base station $100_2$. Specifically, the BS switching request includes a center frequency of 2503.5 MHz and a band width of 5 MHz. The BS switch processing unit 272 sets the center frequency and band width of the mobile station 200 to the specified ones, thereby connecting to the destination base station $100_2$ (Step S1546). The BS switch processing unit 272 sends a BS switching completion report to the control unit 276 (Step S1548). Instead of detecting that the time comes close to the transmission timing of the DCD/UCD information, the elapsed time since the transmission frame number of the DCD/UCD information is obtained may be measured, or the frame number may be checked each time a frame is received, for example.

The mobile station 200 receives a downlink signal (Step S1550). The message processing unit 258 obtains DCD/UCD information included in the downlink signal (Step S1552). The message processing unit 258 stores the obtained DCD/UCD information in the DCD/UCD information storing unit 266 (Step S1554).

The control unit 276 places a BS switching request to the BS switch processing unit 272 in order to make connection to the destination base station $100_1$ (Step S1556). The BS switching request may include the center frequency and band width of the destination base station $100_1$. For example, the BS switching request includes a center frequency of 2498.5 MHz and a band width of 5 MHz. The BS switch processing unit 272 sets the center frequency and band width of the mobile station 200 to the specified ones, thereby connecting to the destination base station $100_1$ (Step S1558). The BS switch processing unit 272 sends a BS switching completion report to the control unit 276 (Step S1560).

The control unit 276 refers to the numbers of the start and end frames of the listening interval stored in the paging information storing unit 268 (Step S1562). The control unit 276 then refers to the number of the DCD/UCD transmission frame stored in the DCD/UCD transmission timing information storing unit 262 (Step S1564).

The control unit 276 compares the numbers of the start and end frames of the listening interval and the number of the DCD/UCD transmission frame (Step S1566). The control unit 276 determines whether the timing at which the destination base station $100_2$ transmits the DCD/UCD information is to occur during the listening interval.

If the timing at which the destination base station $100_2$ transmits the DCD/UCD information is to occur during the listening interval (Step S1566: YES), the control unit 276 requests the data presence determining unit 264 to determine whether there are data directed to the mobile station 200 (Step S1568).

In the present embodiment, for example, the mobile station 200 updates its location information (location update) with respect to the source base station $100_1$ based on the IEEE802.16e standard (Step S1570). The mobile station 200 may transmit a ranging request (RNG-REQ) to the source base station $100_1$. Then, based on a ranging response (RNG-RSP) transmitted by the base station $100_1$, the mobile station 200 may determine the presence or absence of data directed to the mobile station (Step S1572). For example, the ranging response (RNG-RSP) includes a field indicating the presence or absence of data directed to the mobile station 200. The data presence determining unit 246 refers to the field so as to determine the presence or absence of data. As a result of the location update, the data presence determining unit 264 determines the absence of data directed to the mobile station 200, and sends the result to the control unit 276 (Step S1574).

If it is understood based on the result sent from the data presence determining unit 264 that there are data directed to the mobile station 200 (Step S1576), the control unit 276 requests the network registration processing unit 270 to perform its processing operation in order to receive the data (Step S1578).

The network registration processing unit 270 performs the network registration process with respect to the base station $100_1$ (Step S1580). The network registration processing unit 270 causes the mobile station 200 to wake up from idle mode so as to be ready for receiving downlink data.

Next is described the third modification of the mobile station 200 of the second embodiment.

The modified mobile station 200 includes, among the components of the mobile station 200 described with reference to FIG. 7, the CINR measuring unit 252, the preprocessing execution condition storing unit 254, the message processing unit 258, the MOB_PAG-ADV reception managing unit 260, the DCD/UCD transmission timing information storing unit 262, the data presence determining unit 264, the DCD/UCD information storing unit 266, the paging information storing unit 268, the network registration processing unit 270, the BS switch processing unit 272, the BS connection information storing unit 274 and the control unit 276.

Figure 19:
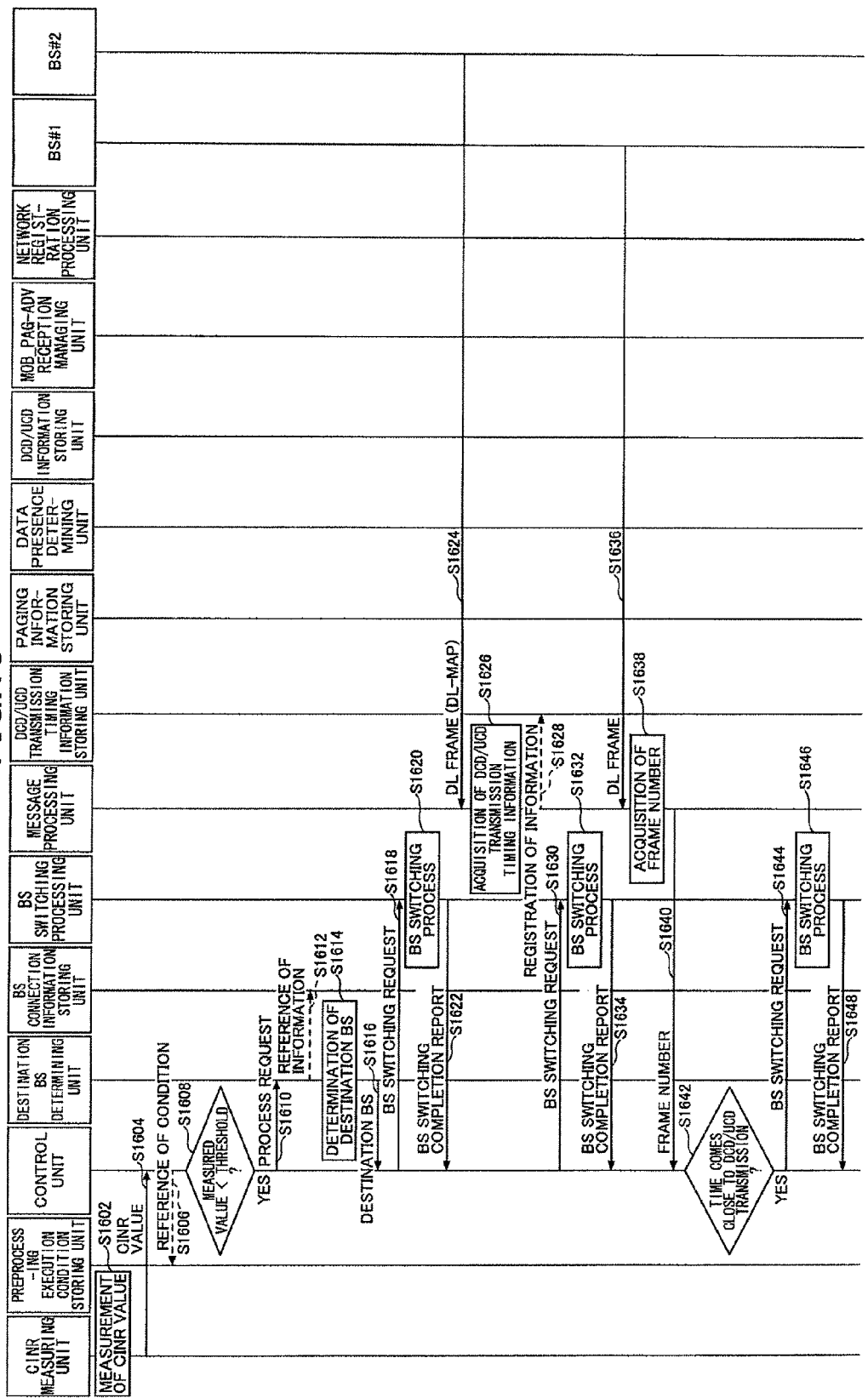
FIG. 19 is a flowchart showing an operation of a mobile station according to one modification.
Figure 20:
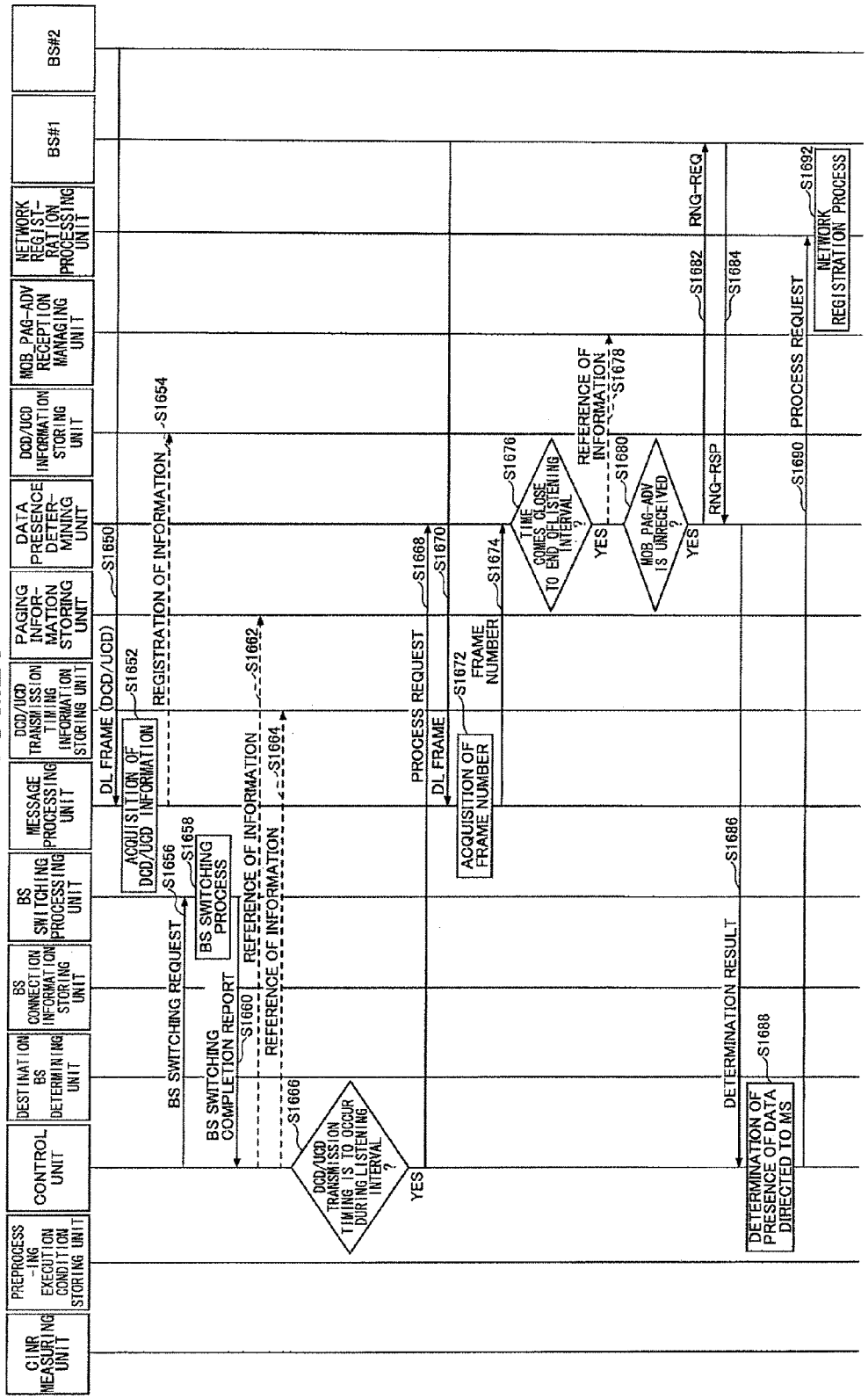
FIG. 20 is a flowchart showing the operation of the mobile station according to the modification.

The operation of the mobile station 200 of the present modification is described with reference to FIGS. 19 and 20.

In the operation of the mobile station 200 according to the present modification, Steps S1602 through S1634 are the same as Steps S1002 through S1034 described above with reference to FIG. 10.

The mobile station 200 receives a downlink signal (Step S1636). The message processing unit 258 obtains a frame number included in the downlink signal (Step S1638). The message processing unit 258 inputs the obtained frame number to the control unit 276 (Step S1640).

The control unit 276 detects that the time comes close to the transmission timing of the DCD/UCD information of the destination base station $100_2$ (Step S1642: YES). The control unit 276 places a BS switching request to the BS switch processing unit 272 in order to make connection to the destination base station $100_2$ (Step S1644). The BS switching request may include the center frequency and band width of the destination base station $100_2$. Specifically, the BS switching request includes a center frequency of 2503.5 MHz and a band width of 5 MHz. The BS switch processing unit 272 sets the center frequency and band width of the mobile station 200 to the specified ones, thereby connecting to the destination base station $100_2$ (Step S1646). The BS switch processing unit 272 sends a BS switching completion report to the control unit 276 (Step S1648). Instead of detecting that the time comes close to the transmission timing of the DCD/UCD information, the elapsed time since the transmission frame number of the DCD/UCD information is obtained may be measured, or the frame number may be checked each time a frame is received, for example.

The mobile station 200 receives a downlink signal (Step S1650). The message processing unit 258 obtains DCD/UCD information included in the downlink signal (Step S1652). The message processing unit 258 stores the obtained DCD/UCD information in the DCD/UCD information storing unit 266 (Step S1654).

The control unit 276 places a BS switching request to the BS switch processing unit 272 in order to make connection to the destination base station $100_1$ (Step S1656). The BS switching request may include the center frequency and band width of the destination base station $100_1$. For example, the BS switching request includes a center frequency of 2498.5 MHz and a band width of 5 MHz. The BS switch processing unit 272 sets the center frequency and band width of the mobile station 200 to the specified ones, thereby connecting to the destination base station $100_1$ (Step S1658). The BS switch processing unit 272 sends a BS switching completion report to the control unit 276 (Step S1660).

The control unit 276 refers to the numbers of the start and end frames of the listening interval stored in the paging information storing unit 268 (Step S1662). The control unit 276 then refers to the number of the DCD/UCD transmission frame stored in the DCD/UCD transmission timing information storing unit 262 (Step S1664).

The control unit 276 compares the numbers of the start and end frames of the listening interval and the number of the DCD/UCD transmission frame (Step S1666). The control unit 276 determines whether the timing at which the destination base station 100₂ transmits the DCD/UCD information is to occur during the listening interval.

If the timing at which the destination base station 100₂ transmits the DCD/UCD information is to occur during the listening interval (Step S1666: YES), the control unit 276 requests the data presence determining unit 264 to determine whether there are data directed to the mobile station 200 (Step S1668).

The mobile station 200 receives a downlink signal (Step S1670). The message processing unit 258 obtains a frame number included in the downlink signal (Step S1672). The message processing unit 258 inputs the obtained frame number to the data presence determining unit 264 (Step S1674).

Based on the received frame number, the data presence determining unit 264 determines whether the time comes close to the end of the listening interval (Step S1676). If determining that the time comes close to the end of the listening interval (Step S1676: YES), the data presence determining unit 264 refers to the MOB_PAG-ADV reception managing unit 260 (Step S1678). If it is determined that MOB_PAG-ADV is yet to be received (Step S1680: YES), the mobile station 200 updates its location information (location update) with respect to the source base station 100₁ based on the IEEE802.16e standard, for example (Step S1682). The mobile station 200 may transmit a ranging request (RNG-REQ) to the source base station 100₁. Then, based on a ranging response (RNG-RSP) transmitted by the base station 100₁, the mobile station 200 may determine the presence or absence of data directed to the mobile station (Step S1684). For example, the ranging response (RNG-RSP) includes a field indicating the presence or absence of data directed to the mobile station 200. The data presence determining unit 246 refers to the field so as to determine the presence or absence of data directed to the mobile station 20. As a result of the location update, the data presence determining unit 264 determines the absence of data directed to the mobile station 200, and sends the result to the control unit 276 (Step S1686).

If it is understood based on the result sent from the data presence determining unit 264 that there are data directed to the mobile station 200 (Step S1688), the control unit 276 requests the network registration processing unit 270 to perform its processing operation in order to receive the data (Step S1690).

The network registration processing unit 270 performs the network registration process with respect to the base station 100₁ (Step S1692) The network registration processing unit 270 causes the mobile station 200 to wake up from idle mode so as to be ready for receiving downlink data.

According to the present embodiment and modifications described above, in the case where the mobile station is yet to receive MOB_NBR-ADV and the DCD/UCD transmission timing of the destination base station is to occur during the listening interval determined between the mobile station 200 and the source base station, the mobile station checks with the source base station whether there are data directed to the mobile station. If there are no data directed to the base station, the mobile station gives priority to receiving the DCD/UCD information of the destination base station even during the listening interval. Accordingly, even if the DCD/UCD transmission timing is to occur during the listening interval, the mobile station is able to obtain the DCD/UCD information of the destination base station. As a result, if switching the connection destination to the destination base station before receiving MOB_NBR-ADV, the mobile station is able to promptly initiate communication. In addition, it is possible to shorten the amount of time required to initiate communication after the mobile station switches the connection destination to the destination base station.

All examples and conditional language used herein are intended for pedagogical purposes to aid the reader in understanding the present disclosure and the concepts contributed by the inventor to furthering the art, and are to be construed as being without limitation to such specifically recited examples and conditions, nor does the organization of such examples in the specification relate to a showing of the superiority or inferiority of the present disclosure. Although the embodiments of the present disclosure have been described in detail, it should be understood that various changes, substitutions, and alterations could be made hereto without departing from the spirit and scope of the present disclosure.

What is claimed is:

1. A mobile station comprising:
a switching unit configured to, when the mobile station is located in a communication area of a first base station, switch a reception operation thereof so as to receive a signal transmitted from the first base station during a first time period and so as not to receive the signal transmitted from the first base station during a second time period;
an acquiring unit configured to acquire from a second base station information on a transmission timing of a communication parameter thereof in a case where the mobile station is yet to receive neighboring base station information from the first base station, the neighboring base station information including the communication parameter of the second base station;
a query unit configured to query the first base station as to whether there are data directed to the mobile station from the first base station; and
a receiving unit configured to receive the communication parameter transmitted from the second base station according to the transmission timing of the communication parameter if the information acquired by the acquiring unit indicates that the transmission timing of the communication parameter is to occur during the first time period and a result of the query by the query unit indicates that there are no data directed to the mobile station from the first base station.

2. The mobile station as claimed in claim 1, wherein if the information acquired by the acquiring unit indicates that the transmission timing of the communication parameter is to occur during the first time period, the query unit makes the query immediately before a start of the first time period.

3. The mobile station as claimed in claim 1, wherein if the information acquired by the acquiring unit indicates that the transmission timing of the communication parameter is to occur during the first time period, the query unit makes the query after the receiving unit receives the communication parameter transmitted from the second base station.

4. The mobile station as claimed in claim 3, wherein the query unit makes the query if the mobile station is yet to receive a paging message from the first base station before an end of the first time period.

5. The mobile station as claimed in claim 1, wherein the query unit makes the query by transmitting to the first base station an update of location information of the mobile station.

6. The mobile station as claimed in claim 2, wherein the query unit makes the query by transmitting to the first base station an update of location information of the mobile station.

7. The mobile station as claimed in claim 3, wherein the query unit makes the query by transmitting to the first base station an update of location information of the mobile station.

8. The mobile station as claimed in claim 4, wherein the query unit makes the query by transmitting to the first base station an update of location information of the mobile station.

9. A system comprising:
a first base station;
a second base station; and
a mobile station,
wherein the mobile station comprises:
a switching unit configured to, when a mobile station is located in a communication area of a first base station, switch a reception operation thereof so as to receive a signal transmitted from the first base station during a first time period and so as not to receive the signal transmitted from the first base station during a second time period;
an acquiring unit configured to acquire from a second base station information on a transmission timing of a communication parameter thereof in a case where the mobile station is yet to receive neighboring base station information from the first base station, the neighboring base station information including the communication parameter of the second base station;
a query unit configured to query the first base station as to whether there are data directed to the mobile station from the first base station; and
a receiving unit configured to receive the communication parameter transmitted from the second base station according to the transmission timing of the communication parameter if the information acquired by the acquiring unit indicates that the transmission timing of the communication parameter is to occur during the first time period and a result of the query by the query unit indicates that there are no data directed to the mobile station from the first base station.

10. A method applied to a mobile station, the method comprising:
switching, when the mobile station is located in a communication area of a first base station, a reception operation thereof so as to receive a signal transmitted from the first base station during a first time period and so as not to receive the signal transmitted from the first base station during a second time period;
acquiring from a second base station information on a transmission timing of a communication parameter thereof in a case where the mobile station is yet to receive neighboring base station information from the first base station, the neighboring base station information including the communication parameter of the second base station;
querying the first base station as to whether there are data directed to the mobile station from the first base station; and
receiving the communication parameter transmitted from the second base station according to the transmission timing of the communication parameter if the acquired information indicates that the transmission timing of the communication parameter is to occur during the first time period and a result of the query indicates that there are no data directed to the mobile station from the first base station.

11. The method as claimed in claim 10, wherein if the acquired information indicates that the transmission timing of the communication parameter is to occur during the first time period, the query is made immediately before a start of the first time period.

12. The method as claimed in claim 10, wherein if the acquired information indicates that the transmission timing of the communication parameter is to occur during the first time period, the query is made after the mobile station receives the communication parameter transmitted from the second base station.

13. The method as claimed in claim 10, wherein the query is made if the mobile station is yet to receive a paging message from the first base station before an end of the first time period.

14. The method as claimed in claim 10, wherein the query is made by transmitting to the first base station an update of location information of the mobile station.

15. The method as claimed in claim 11, wherein the query is made by transmitting to the first base station an update of location information of the mobile station.

16. The method as claimed in claim 12, wherein the query is made by transmitting to the first base station an update of location information of the mobile station.

17. The method as claimed in claim 13, wherein the query is made by transmitting to the first base station an update of location information of the mobile station.

* * * * *